United States Patent
Irie et al.

(10) Patent No.: US 8,310,424 B2
(45) Date of Patent: Nov. 13, 2012

(54) LIQUID CRYSTAL DISPLAY APPARATUS AND METHOD FOR DRIVING THE SAME

(75) Inventors: Kentaro Irie, Tsu (JP); Fumikazu Shimoshikiryoh, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 688 days.

(21) Appl. No.: 11/666,290

(22) PCT Filed: Nov. 4, 2005

(86) PCT No.: PCT/JP2005/020290
§ 371 (c)(1),
(2), (4) Date: Apr. 26, 2007

(87) PCT Pub. No.: WO2006/049245
PCT Pub. Date: May 11, 2006

(65) Prior Publication Data
US 2008/0158203 A1    Jul. 3, 2008

(30) Foreign Application Priority Data
Nov. 5, 2004  (JP) .................................. 2004-322876

(51) Int. Cl.
G09G 3/36  (2006.01)
(52) U.S. Cl. .......... 345/89; 345/204; 345/208; 345/211; 345/87; 345/690
(58) Field of Classification Search ............ 345/87–104, 345/204–215, 690–699
See application file for complete search history.

(56) References Cited

U.S. PATENT DOCUMENTS

| | | |
|---|---|---|
| 5,576,863 A | 11/1996 | Aoki et al. |
| 5,847,688 A | 12/1998 | Ohi et al. |
| 5,923,310 A | 7/1999 | Kim |
| 2003/0146893 A1* | 8/2003 | Sawabe ........................... 345/89 |
| 2003/0227429 A1* | 12/2003 | Shimoshikiryo ............... 345/90 |
| 2004/0001167 A1 | 1/2004 | Takeuchi et al. |

(Continued)

FOREIGN PATENT DOCUMENTS

EP    0 981 127 A1    2/2000

(Continued)

OTHER PUBLICATIONS

International Search Report of PCT/JP2005/020290, mailed Dec. 13, 2005.

(Continued)

*Primary Examiner* — Kevin M Nguyen
*Assistant Examiner* — Cory Almeida
(74) *Attorney, Agent, or Firm* — Nixon & Vanderhye P.C.

(57) ABSTRACT

A liquid crystal display device according to the present invention includes an LCD panel 10 including a liquid crystal layer, electrodes for applying a voltage to the liquid crystal layer, and a pixel, of which the luminance varies according to a display signal voltage supplied through a transistor. The pixel includes a first subpixel to have a first luminance and a second subpixel to have a second luminance, which is different from the first luminance, in response to at least one display signal voltage supplied. The device further includes: a source driver 40 for supplying the display signal voltage to a source bus line connected to the source of the transistor; a gate driver 30 for supplying a scan signal voltage to a gate bus line connected to the gate of the transistor; and luminance switching circuitry 60 for switching a first mode, in which the first luminance is higher than the second luminance, into a second mode, in which the first luminance is lower than the second luminance, or vice versa, thereby increasing the reliability of a liquid crystal display device with a pixel division structure.

34 Claims, 20 Drawing Sheets

U.S. PATENT DOCUMENTS

2004/0239698 A1 12/2004 Kamada et al.

FOREIGN PATENT DOCUMENTS

| | | |
|---|---|---|
| JP | 7-121144 | 5/1995 |
| JP | 2003-295160 | 10/2003 |
| JP | 2004-62146 | 2/2004 |
| JP | 2004-78157 | 3/2004 |
| JP | 2004-302023 | 10/2004 |

OTHER PUBLICATIONS

European Search Report mailed May 4, 2009 in corresponding EP application 058000325.2.

English translation of the International Preliminary Report on Patentability mailed May 18, 2007 in corresponding PCT application PCT/JP2005/020290.

* cited by examiner

FIG.1 (a)
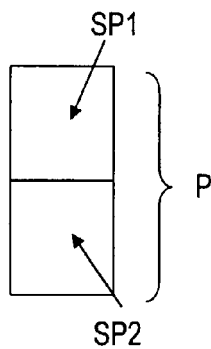
(b)
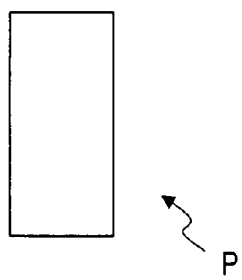
FIG.2
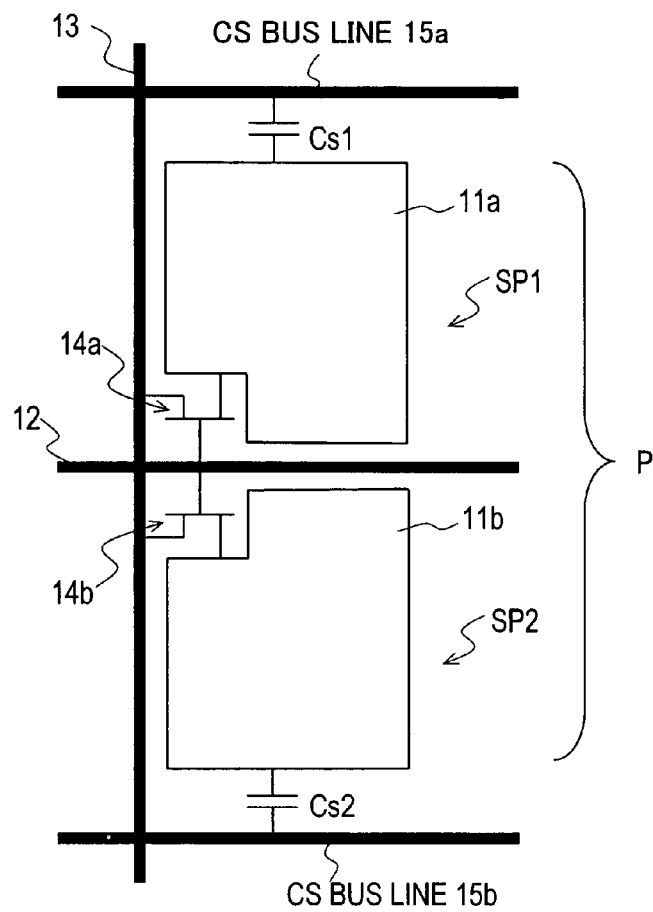

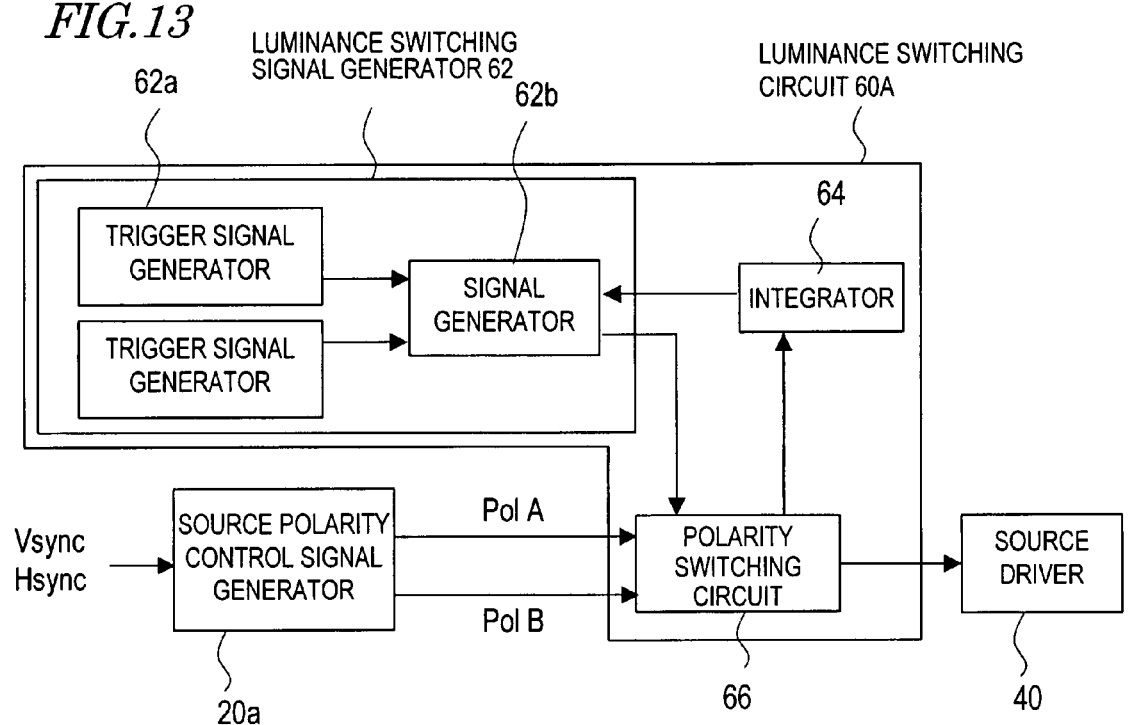
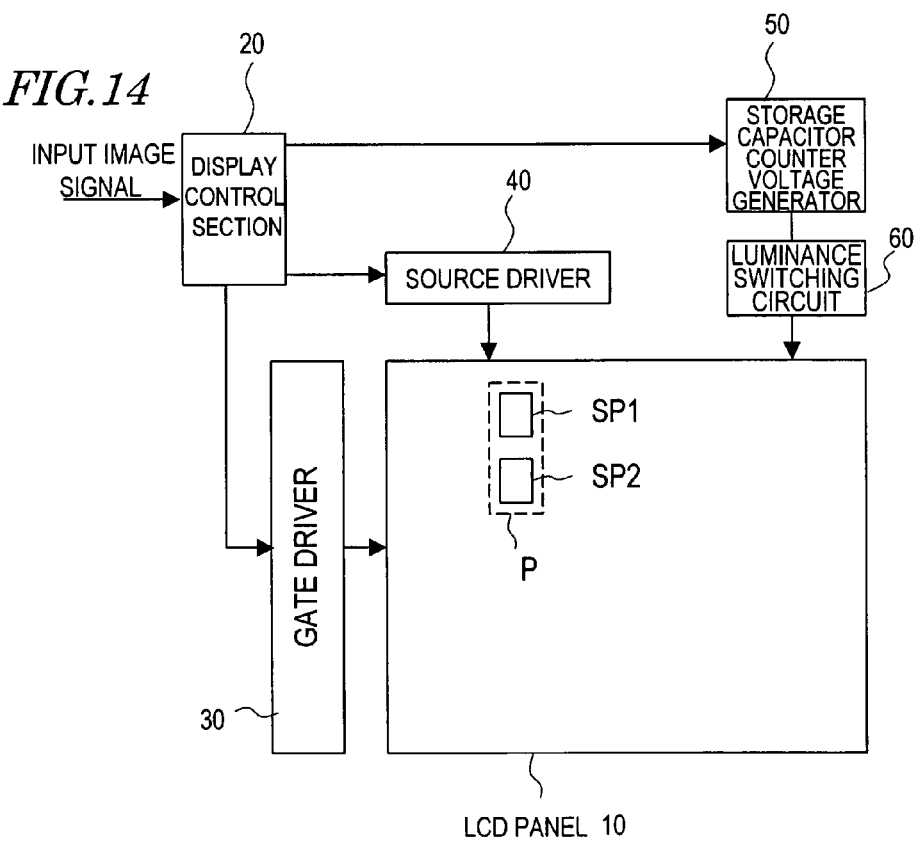

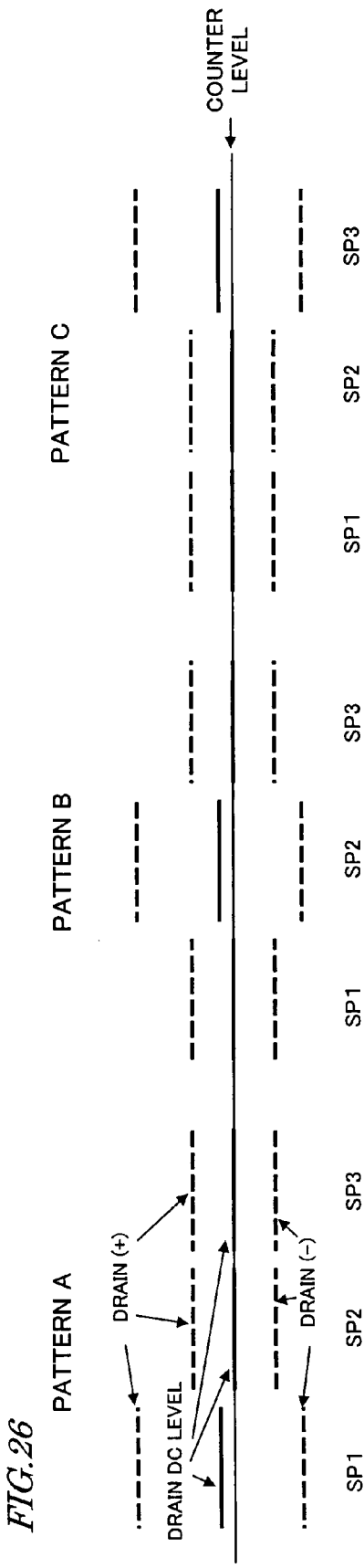

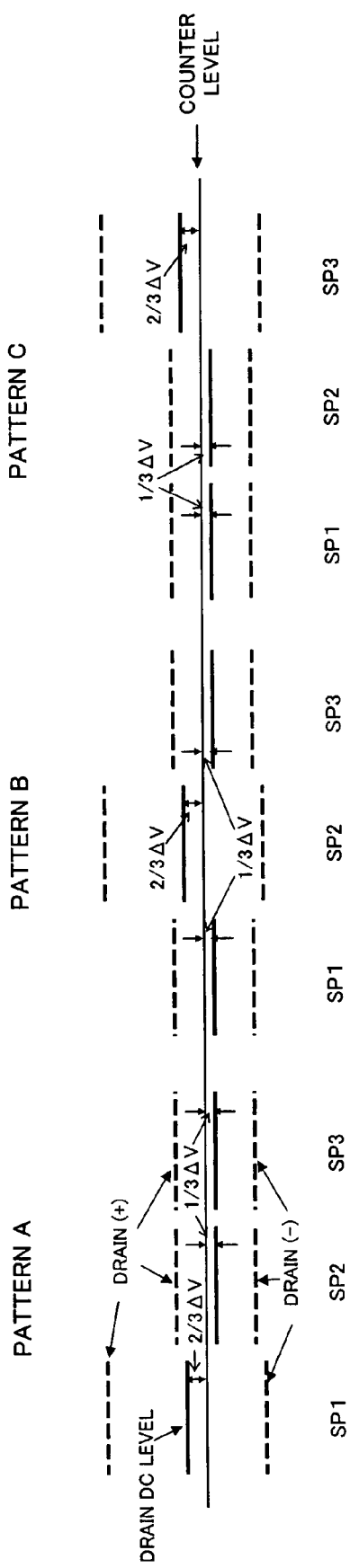

LIQUID CRYSTAL DISPLAY APPARATUS AND METHOD FOR DRIVING THE SAME

This application is the US national phase of international application PCT/JP2005/020290, filed 4 Nov. 2005, which designated the U.S. and claims priority of JP 2004-322876, filed 5 Nov. 2004, the entire contents of each of which are hereby incorporated by reference.

TECHNICAL FIELD

The present invention relates to a liquid crystal display device and a method for driving the device.

BACKGROUND ART

In the past, TN-mode liquid crystal displays (LCDs) were used often. Recently, however, VA-mode LCDs and IPS-mode LCDs with better viewing angle characteristics than the TN-mode LCDs have been used more and more extensively. Meanwhile, MVA-mode LCDs and S-IPS mode LCDs with further improved viewing angle characteristics have been used for TVs and monitors lately.

The VA mode realizes black display of higher quality than the IPS mode, and therefore, contributes to presenting images at a higher contrast ratio. But the VA mode is inferior to the IPS mode in that the r characteristic has heavier viewing angle dependence.

To overcome this problem, Patent Document No. 1 proposes a method of averaging the viewing angle dependence of the γ characteristic by splitting each pixel into a plurality of subpixels and applying mutually different voltages to those subpixels. The LCD disclosed in Patent Document No. 1 has a configuration in which display signal voltages are applied independently of each other to a plurality of subpixels that a single pixel has. That is to say, if each pixel is made up of two subpixels (which will be referred to herein as "first and second subpixels", respectively), a source bus line for applying a display signal voltage to the first subpixel and another source bus line for applying a display signal voltage to the second subpixel need to be provided separately. That is why if each pixel is divided into two, then the number of source bus lines and the number of source drivers need to be doubled. Also, two different display signal voltages are set in advance and stored in a lookup table so to be applied to the first and second subpixels, respectively.

On the other hand, Patent Document Nos. 2 and 3 disclose LCDs, each including a plurality of subpixels that will have mutually different luminances responsive to at least one display signal voltage applied. In such an LCD, since a common display signal voltage is applied through the same source bus line to the first and second subpixels, there is no need to increase the number of source bus lines or source drivers according to the number of divisions.

Patent Document No. 1: Japanese Patent Application Laid-Open Publication No. 2003-295160
Patent Document No. 2: Japanese Patent Application Laid-Open Publication No. 2004-62146
Patent Document No. 3: Japanese Patent Application Laid-Open Publication No. 2004-78157
Patent Document No. 4: Japanese Patent Application Laid-Open Publication No. 6-332009

DISCLOSURE OF INVENTION

Problems to be Solved by the Invention

However, when the present inventors actually made the liquid crystal display devices disclosed in Patent Documents Nos. 2 and 3 to see how they worked, we discovered that those devices sometimes failed to operate with sufficient reliability and that such decrease in reliability was due to the application of a DC voltage to their liquid crystal layer.

In general, a liquid crystal display device is AC driven irrespective of its display mode to prevent a DC voltage from being applied to its liquid crystal layer. That is to say, by inverting the direction of the electric field, generated in the liquid crystal layer, in every predetermined amount of time, the liquid crystal display device is driven so as to leave no electric field in a particular direction (i.e., a DC voltage) when the voltages are averaged with time. In an active-matrix-addressed liquid crystal display device, the voltage applied to the liquid crystal layer of each pixel represents the difference between the common voltage (Vcom) applied to the counter electrode and the display signal voltage applied to the pixel electrode. That is why when the device is AC driven, the polarity of the display signal voltage is inverted in every predetermined amount of time with respect to the common voltage applied to the counter electrode. The interval at which the polarity of the display signal voltage is inverted may be one vertical scanning period (which is typically one frame period of an input image signal).

In an active-matrix-addressed liquid crystal display device using transistors, just after a transistor has been turned OFF, a voltage called a "(drain) feedthrough voltage" is applied to the liquid crystal layer due to parasitic capacitance (Cgd) between the gate and drain of the transistor. The feedthrough voltage depends on the magnitude of the liquid crystal capacitance, which is formed by the subpixel electrode, liquid crystal layer and counter electrode. A pixel capacitance consists of the liquid crystal capacitance and storage capacitance. And the liquid crystal capacitance depends on the voltage. That is why to prevent the DC voltage from being generated due to the feedthrough voltage, the display signal voltage is set so as to cancel the feedthrough voltage for every data (i.e., image data or input image signal) to be presented.

However, the liquid crystal display devices disclosed in Patent Documents Nos. 2 and 3, including a plurality of subpixels showing mutually different luminances for a single display signal voltage supplied, cannot regulate the applied voltage on a subpixel-by-subpixel basis, and therefore, sometimes cannot prevent the DC voltage from being generated due to the feedthrough voltage and cannot achieve sufficient reliability, either.

In order to overcome the problems described above, a primary object of the present invention is to increase the reliability of a liquid crystal display device with a pixel division structure.

Means for Solving the Problems

A liquid crystal display device according to the present invention includes an LCD panel including a liquid crystal layer, a plurality of electrodes for applying a voltage to the liquid crystal layer, and a pixel, of which the luminance varies according to a display signal voltage supplied through a transistor. The pixel includes a first subpixel to have a first luminance and a second subpixel to have a second luminance, which is different from the first luminance, in response to at least one display signal voltage supplied. The device further includes: a source driver for supplying the display signal voltage to a source bus line that is connected to the source of the transistor; a gate driver for supplying a scan signal voltage to a gate bus line that is connected to the gate of the transistor; and luminance switching circuitry for switching the modes of operation from a first mode, in which the first luminance is higher than the second luminance, into a second mode, in which the first luminance is lower than the second luminance, and vice versa.

As used herein, the "first luminance" and the "second luminance" do not refer to fixed luminance levels but are used to identify their associated subpixels. That is to say, a subpixel that is displayed at a first luminance in a particular display state (in a certain frame) will be referred to herein as a "first subpixel (such as SP1 to be described later)". And a subpixel that is displayed at a second luminance, which is different from the first luminance, in that display state will be referred to herein as a "second subpixel (such as SP2 to be described later)". Alternatively, two subpixels with mutually different luminances may be referred to as "first subpixels". The first and second subpixels defined in this manner are switched between a first mode in which the first luminance is higher than the second luminance (i.e., the first subpixel is brighter than the second subpixel) and a second mode in which the first luminance is lower than the second luminance (i.e., the first subpixel is darker than the second subpixel).

These modes of operation may be switched either by randomly selecting the first and second modes or by intentionally switching from the first mode into the second mode, or vice versa. Also, the luminance switching circuitry may be implemented as an additional luminance switching circuit for switching the luminances, an existent circuit (such as a source driver and a storage capacitor voltage generator) and/or a combination thereof.

In one preferred embodiment, each of the first and second subpixels further includes: a liquid crystal capacitor formed by a counter electrode and a subpixel electrode that faces the counter electrode through the liquid crystal layer; a storage capacitor formed by a storage capacitor electrode that is electrically connected to the subpixel electrode, an insulating layer, and a storage capacitor counter electrode that is opposed to the storage capacitor electrode with the insulating layer interposed between them; and a storage capacitor counter voltage generator for generating a voltage to be applied to the storage capacitor counter electrode. The counter electrode is a single electrode provided in common for the first and second subpixels while the storage capacitor counter electrodes of the first and second subpixels are electrically independent of each other. The device further includes two switching elements that are provided for the first and second subpixels, respectively. The ON/OFF states of the two switching elements are controlled in accordance with a scan signal voltage supplied through a common gate bus line. When the two switching elements are ON, a display signal voltage is applied through a common source bus line to the subpixel electrodes and the storage capacitor electrodes of the first and second subpixels. After the two switching elements have been turned OFF, the voltages at the storage capacitor counter electrodes of the first and second subpixels vary. And the first and second subpixels have mutually different variations, which are defined by their directions and amplitudes, thus making the first and second luminances different from each other.

In this particular preferred embodiment, the luminance switching circuitry includes a circuit for inverting the phases of voltages to be applied to the storage capacitor counter electrodes of the first and second subpixels.

In an alternative preferred embodiment, the luminance switching circuitry includes a circuit for inverting the phases of the display signal voltages to be supplied to the first and second subpixels.

In another preferred embodiment, the luminance switching circuitry switches the modes of operation at an interval that is at least as long as two frames of an input image signal.

In still another preferred embodiment, the luminance switching circuitry further includes a circuit for counting and measuring the amount of time that has passed since the modes were switched, and switches the modes of operation every time a predetermined amount of time passes.

In yet another preferred embodiment, the liquid crystal display device further includes a circuit for finding the integral of operating periods in the first mode and the integral of operating periods in the second mode. When a difference between the integral of the operating periods in the first mode and that of the operating periods in the second mode exceeds a predetermined value, the luminance switching circuitry switches the modes of operation.

In yet another preferred embodiment, when a difference between the first and second luminances exceeds a predetermined value, the luminance switching circuitry switches the modes of operation.

In yet another preferred embodiment, the liquid crystal display device further includes a circuit for calculating an average luminance over the entire screen. When the average luminance falls within a predetermined range, the luminance switching circuitry switches the modes of operation.

In a specific preferred embodiment, the predetermined range corresponds to gray scales at which the ratio of the difference between the first and second luminances to the average of the first and second luminances is 90% or less of its maximum value.

In yet another preferred embodiment, the luminance switching circuitry switches the modes of operation in accordance with a predetermined instruction given by the operator of the device.

In yet another preferred embodiment, when a predetermined variation is produced in the input image signal, the luminance switching circuitry switches the modes of operation.

In yet another preferred embodiment, the luminance switching circuitry further includes a luminance switching signal generator for generating a luminance switching signal when a predetermined condition is satisfied, and the circuitry switches the modes of operation in response to the luminance switching signal.

In yet another preferred embodiment, the luminance switching signal generator includes a plurality of trigger signal generators for generating trigger signals on mutually different conditions and a signal generator for generating the luminance switching signal responsive to the trigger signals supplied from the plurality of trigger signal generators.

In yet another preferred embodiment, the areas of the first and second subpixels are approximately equal to each other.

In yet another preferred embodiment, the pixel further includes a third subpixel. The third subpixel may or may not have the same luminance as the first or second subpixel.

Another liquid crystal display device according to the present invention includes an LCD panel including a liquid crystal layer, a plurality of electrodes for applying a voltage to the liquid crystal layer, and a pixel, of which the luminance varies according to a display signal voltage supplied through a transistor. The pixel is split into a plurality of subpixels including two subpixels for conducting a display operation at mutually different luminances in response to at least one display signal voltage supplied. The device further includes: a source driver for supplying the display signal voltage to a source bus line that is connected to the source of the transistor; a gate driver for supplying a scan signal voltage to a gate bus line that is connected to the gate of the transistor; and luminance switching circuitry for switching the modes of operation between a plurality of modes in which one of the subpixels that has the highest luminance changes its locations within the pixel.

In one preferred embodiment, each of the subpixels further includes: a liquid crystal capacitor formed by a counter electrode and a subpixel electrode that faces the counter electrode through the liquid crystal layer; a storage capacitor formed by a storage capacitor electrode that is electrically connected to the subpixel electrode, an insulating layer, and a storage capacitor counter electrode that is opposed to the storage capacitor electrode with the insulating layer interposed between them; and a storage capacitor counter voltage generator for generating a voltage to be applied to the storage capacitor counter electrode. The counter electrode is a single electrode provided in common for the multiple subpixels, while the storage capacitor counter electrodes of the subpixels are electrically independent of each other. The device further includes a plurality of switching elements that are provided for the respective subpixels. The ON/OFF states of the switching elements are controlled in accordance with a scan signal voltage supplied through a common gate bus line. When the switching elements are ON, a display signal voltage is applied through a common source bus line to the subpixel electrodes and the storage capacitor electrodes of the subpixels. After the switching elements have been turned OFF, the voltages at the storage capacitor counter electrodes of the subpixels vary. And the two subpixels have mutually different variations, which are defined by their directions and amplitudes, thus making the luminances of the two subpixels different from each other.

In another preferred embodiment, one of the subpixels that has the highest luminance and another one of the subpixels that has the lowest luminance have substantially equal areas.

In still another preferred embodiment, the areas of the subpixels are substantially equal to each other.

An LCD driving method according to the present invention is a method for driving an LCD panel, which includes a liquid crystal layer, a plurality of electrodes for applying a voltage to the liquid crystal layer, and a pixel, of which the luminance varies according to a display signal voltage supplied through a transistor. The pixel includes a first subpixel to have a first luminance and a second subpixel to have a second luminance, which is different from the first luminance, in response to at least one display signal voltage supplied. The method includes the step of switching the modes of operation from a first mode in which the first luminance is higher than the second luminance into a second mode in which the first luminance is lower than the second luminance, and vice versa.

Another LCD driving method according to the present invention is a method for driving an LCD panel, which includes a liquid crystal layer, a plurality of electrodes for applying a voltage to the liquid crystal layer, and a pixel, of which the luminance varies according to a display signal voltage supplied through a transistor. The pixel is split into a plurality of subpixels including two subpixels for conducting a display operation at mutually different luminances in response to at least one display signal voltage supplied. The method includes the step of switching the modes of operation between a plurality of modes in which one of the subpixels that has the highest luminance changes its locations within the pixel.

The step of switching the modes is preferably performed at an interval that is at least as long as two frames of an input image signal.

In one preferred embodiment, the step of switching the modes includes randomly selecting the first and second modes.

In another preferred embodiment, the step of switching the modes includes intentionally switching the modes from the first mode into the second mode, or vice versa.

Effect of the Invention

In a liquid crystal display device according to the present invention, each pixel thereof includes two subpixels to have mutually different luminances (i.e., a bright subpixel and a dark subpixel), thereby reducing the viewing angle dependence of the γ characteristic. There are various pixel division techniques. For example, if the method disclosed in Patent Documents Nos. 2 and 3 is adopted, two subpixels to show mutually different luminances in response to a single display signal voltage supplied can be obtained in a relatively simple configuration. In addition, since the modes are switched so as to reverse the relation in the magnitude of luminance between the two subpixels, the DC voltages generated in the subpixels can be averaged. Consequently, by regulating the display signal voltage applied to the subpixel electrode (and the counter voltage), the DC voltages generated in the subpixels can be reduced to substantially zero when averaged, thus increasing the reliability of the liquid crystal display device significantly.

The mode switching operation to change the relation in the magnitude of luminance between the subpixels is performed so as to average the DC voltages generated in the subpixels. Typically, the switching operation may be performed at an interval of several tens of minutes to several hours. The interval needs to be at least as long as two vertical scanning periods and is preferably longer than the response time of the liquid crystal molecules. As used herein, the "response time" means the amount of time it takes for a pixel to have a luminance value corresponding to a predetermined voltage applied to the liquid crystal layer of the pixel after the voltage has been applied there, and is typically in the range of several milliseconds to several tens of milliseconds.

Patent Document No. 1 also discloses that subpixels with mutually different luminances are preferably switched. According to Patent Document No. 1, however, it is to minimize flicker that the subpixels are switched. Also, as Patent Document No. 1 discloses that the subpixels are preferably switched within one frame period, the subpixels should be switched much quicker than the time resolution of human visual sense. In other words, if the subpixels were switched at an interval of two frame periods or more, the flicker could not be minimized.

BRIEF DESCRIPTION OF DRAWINGS

FIG. 1(a) is a schematic representation showing the pixel division structure of a liquid crystal display device according to a preferred embodiment of the present invention, and FIG. 1(b) is a schematic representation showing a normal pixel.

FIG. 2 schematically shows the electrical configuration of a pixel in a liquid crystal display device according to a preferred embodiment of the present invention.

FIG. 13 is a schematic representation showing a configuration for a luminance switching circuit 60A, which can be used effectively as the luminance switching circuit 60 of the liquid crystal display device shown in FIG. 12.

FIG. 14 is a schematic representation showing a circuit configuration for a liquid crystal display device according to another preferred embodiment of the present invention.

FIG. 26 shows the drain voltage levels of respective subpixels and counter electrode voltage levels in a liquid crystal display device according to the third preferred embodiment of the present invention.

FIG. 27 shows the drain voltage levels of respective subpixels and counter electrode voltage levels in another liquid crystal display device according to the third preferred embodiment of the present invention.

DESCRIPTION OF REFERENCE NUMERALS

Figure 3:
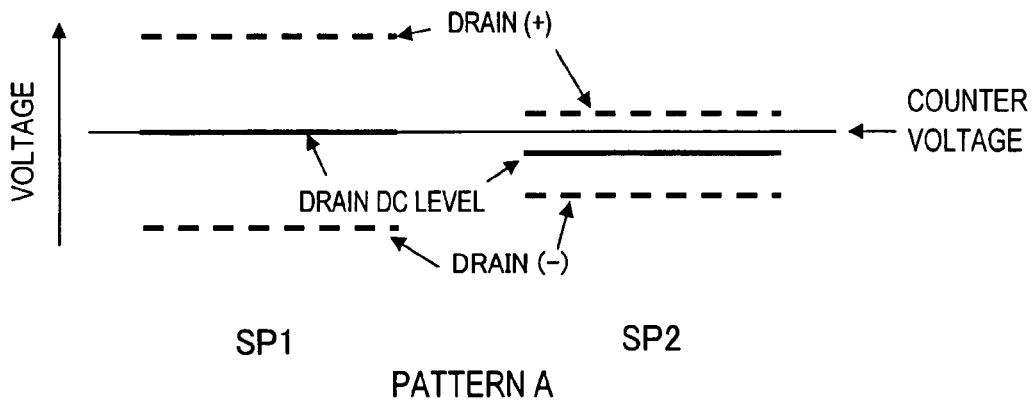
FIG. 3 shows how DC components are applied to the liquid crystal layer of subpixels in the pixel division structure.

10 LCD panel
20 display control section
30 gate driver
40 source driver
50 storage capacitor counter voltage generator (CS signal generator)
60A, 60B, 60C luminance switching circuit

BEST MODE FOR CARRYING OUT THE INVENTION

Hereinafter, preferred embodiments of a liquid crystal display device and a method for driving the device according to the present invention will be described with reference to the accompanying drawings. In the preferred embodiments of the present invention to be described below, a pixel is supposed to be split into two subpixels. However, the present invention is in no way limited to those specific preferred embodiments and the number of divisions (i.e., the number of subpixels per pixel) may be three or more.

A liquid crystal display device according to a preferred embodiment of the present invention has a pixel division structure as schematically shown in FIG. 1(a). That is to say, a single pixel P shown in FIG. 1(b) is split into two subpixels SP1 and SP2 such that the subpixels SP1 and SP2 can be supplied with mutually different voltages. By supplying two different voltages to the subpixels SP1 and SP2 such that the subpixels have respectively different γ characteristics, the viewing angle dependence of the γ characteristic can be reduced.

To provide two subpixels that can be supplied with mutually different voltages, a configuration in which the number of pixels is simply doubled may be adopted. However, the cost will increase in that case. To avoid such a situation, various alternative arrangements have been proposed so far. In this preferred embodiment, the arrangement disclosed in Patent Document No. 2 is adopted from those arrangements. On the other hand, if the arrangement disclosed in Patent Document No. 4, for example, in which an additional capacitor is connected in series to the liquid crystal capacitor of one subpixel and in which in the voltages distributed to the capacitors of respective subpixels, the voltage applied to the liquid crystal capacitor of one subpixel is decreased, is adopted, then the two subpixels will have a fixed luminance relation that cannot be inverted.

FIG. 2 schematically shows an electrical configuration for a pixel in a liquid crystal display device according to a preferred embodiment of the present invention.

As shown in FIG. 2, the pixel P is divided into a subpixel SP1 and another subpixel SP2. To the subpixel electrodes 11a and 11b of the subpixels SP1 and SP2, connected are their associated TFTs 14a and 14b and their associated storage capacitors CS1 and CS2, respectively. The gate electrodes of the TFTs 14a and 14b are both connected to the same gate bus line (scan line) 12. And the source electrodes of the TFTs 14a and 14b are connected to the same source bus line (signal line) 13. The storage capacitors CS1 and CS2 are connected to their associated CS bus lines (storage capacitor lines) 15a and 15b, respectively. The storage capacitor CS1 includes a storage capacitor electrode that is electrically connected to the subpixel electrode 11a, a storage capacitor counter electrode that is electrically connected to the CS bus line 15a, and an insulating layer (such as a gate insulating film (not shown)) arranged between the electrodes. The storage capacitor CS2 includes a storage capacitor electrode that is electrically connected to the subpixel electrode 11b, a storage capacitor counter electrode that is electrically connected to the CS bus line 15b, and an insulating layer (such as a gate insulating film (not shown)) arranged between the electrodes. The respective storage capacitor counter electrodes of the storage capacitors CS1 and CS2 are independent of each other and have such a structure as receiving mutually different storage capacitor counter voltages (which are also called "CS signals") from the CS bus lines 15a and 15b, respectively.

A display signal voltage is applied through the common source bus line 13 to the subpixel electrodes 11a and 11b to turn the TFTs 14a and 14b OFF. After that, if the voltages applied to the storage capacitor counter electrodes of the storage capacitors CS1 and CS2 (through the CS bus lines 15a and 15b, respectively) are varied in different directions and to different degrees, then the effective voltages applied to the liquid crystal capacitors of the subpixels SP1 and SP2 (i.e., the luminances) will be different from each other. By adopting this configuration, the display signal voltage can be applied through the single source bus line 13 to the two subpixels SP1 and SP2. Consequently, the subpixels SP1 and SP2 can have mutually different luminances without increasing the number of source bus lines or source drivers. For example, responsive to a certain display signal voltage supplied, the subpixel SP1 can display at a higher luminance than the subpixel SP2. In this case, the subpixel SP1 does not have to display at a higher luminance than the subpixel SP2 responsive to every display signal voltage (i.e., gray scale display signal) supplied but just needs to display at a higher luminance responsive to at least one display signal voltage at a half scale tone. Typically, at all half scale tones but black (i.e., the lowest gray scale) and white (i.e., the highest gray scale), the subpixel SP1 displays at a higher luminance than the subpixel SP2.

If such a pixel division structure is adopted, however, the display signal voltage cannot be regulated independently on a subpixel-by-subpixel basis, and therefore, the feedthrough voltages Vd cannot be canceled for the respective subpixels. As a result, a DC voltage is applied thereto, which is a problem.

Hereinafter, this phenomenon will be described in further detail.

The feedthrough voltage Vd is given by the following Equation (1):

$$Vd = (VgH - VgL) \times Cgd / (Clc(V) + Cgd + Ccs) \qquad (1)$$

where VgH and VgL are voltages applied to the gate of a TFT to turn it ON and OFF, respectively, Cgd is parasitic capacitance produced between the gate and drain of the TFT, Clc(V) is the electrostatic capacitance (value) of the liquid crystal capacitor, and Ccs is the electrostatic capacitance (value) of the storage capacitor.

The electrostatic capacitance Clc of the liquid crystal capacitor depends on the voltage applied to the liquid crystal layer. This is because liquid crystal molecules with dielectric anisotropy change their orientation directions with the voltage applied. That is why the electrostatic capacitance of the liquid crystal capacitor changes with the luminance to display.

As can be seen from Equation (1), the feedthrough voltage Vd depends on the electrostatic capacitance of the liquid crystal capacitor, i.e., depends on the luminance (gray scale) to display.

Since Vd varies with the gray scale, the DC level of the drain voltage (which is the center value of the potential at a subpixel electrode being AC driven and which will also be referred to herein as the "effective level" of the drain voltage) also changes with the gray scale. That is why if the counter voltage has a constant level for every gray scale, then there will be some gray scales at which DC components are applied to the liquid crystal layer. To avoid such a situation, the display signal voltage, which is either a source voltage or a drain voltage, has its center value (i.e., the center value of the potential at a subpixel electrode being AC driven at every gray scale) defined according to the gray scale so as to compensate for Vd associated with that gray scale and the DC level of the drain voltage is substantially equalized with the counter voltage, thereby preventing the DC components from being applied to the liquid crystal layer.

According to the pixel division technique disclosed in Patent Document No. 2 or No. 3, however, if the DC level of the drain voltage for a subpixel SP1 (which is a bright subpixel in this example) is equalized with the counter voltage, then that of the drain voltage for a subpixel SP2 (which is a dark subpixel in this example) does not agree with the counter voltage as shown in FIG. 3. As a result, DC components are applied to the liquid crystal layer of the subpixel SP2. This is because the subpixels SP1 and SP2 have mutually different Vd.

Figure 4:
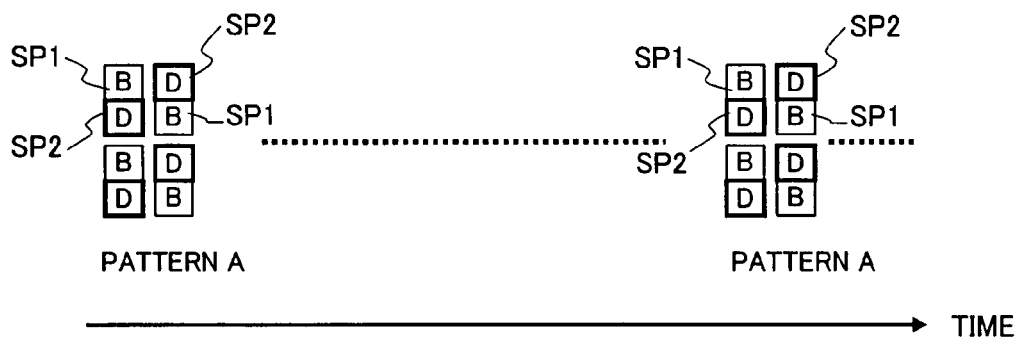
FIG. 4 shows the display state (operating state) of a conventional liquid crystal display device with a pixel division structure.

Also, according to the pixel division technique described above, the luminances of the subpixels have a predetermined order that does not change. For example, as shown in FIG. 4, a pattern in which the subpixel SP1 is a bright subpixel and the subpixel SP2 is a dark subpixel (which will be referred to herein as "pattern A") may be maintained all through the display period as long as the liquid crystal display device is being operated. Therefore, DC components are applied to the liquid crystal layer (and its alignment film) of at least one subpixel, thus producing polarization. As a result, the reliability of liquid crystal display device is sacrificed.

In the example shown in FIG. 4, to make the flicker hardly perceivable, the subpixels SP1 and SP2 are arranged in a checkered pattern such that bright subpixels SP1 or dark subpixels SP2 are not adjacent to each other in the row direction or in the column direction.

In a liquid crystal display device according to a preferred embodiment of the present invention, the arrangements of bright and dark subpixels in an LCD with the pixel division structure are interchanged, thereby preventing (or at least minimizing) DC components from being applied continuously to the liquid crystal layer of each subpixel.

Figure 5:
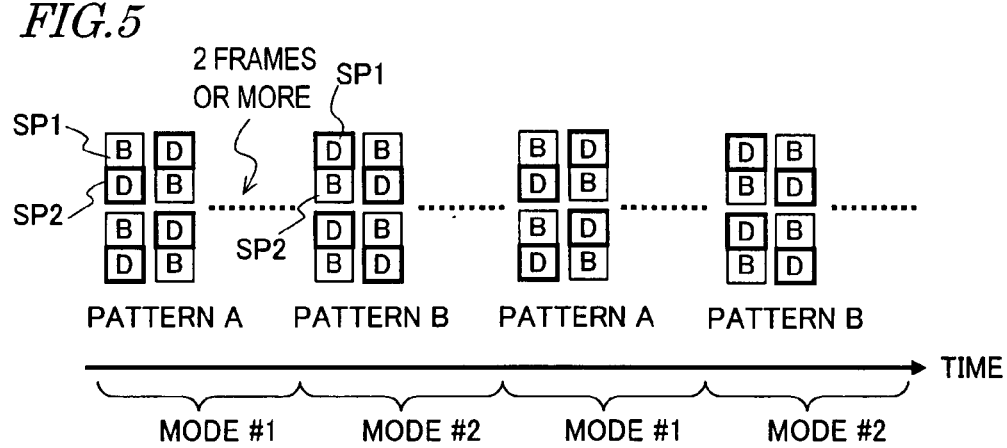
FIG. 5 shows the display state (operating state) of a liquid crystal display device according to a preferred embodiment of the present invention.

A liquid crystal display device according to a preferred embodiment of the present invention switches the modes of operation from Mode #1 that adopts Pattern A in which the subpixel SP1 is a bright subpixel and the subpixel SP2 is a dark subpixel into Mode #2 that adopts Pattern B in which the subpixel SP1 is a dark subpixel and the subpixel SP2 is a bright subpixel, and vice versa, as shown in FIG. 5, thereby reducing the DC components applied to the liquid crystal layer of the subpixel SP1 or SP2. That is to say, it is Pattern A that makes the subpixel SP1 (with the first luminance) provide bright display and the subpixel SP2 (with the second luminance) provide dark display (where the second luminance<the first luminance). On the other hand, it is Pattern B that makes the subpixel SP1 (with the first luminance) provide dark display and the subpixel SP2 (with the second luminance) provide bright display (where the second luminance>the first luminance). That is to say, by inverting the luminance level relation between the first and second subpixels SP1 and SP2 in this manner, the DC components can be reduced. That is to say, the liquid crystal display device of this preferred embodiment of the present invention includes luminance switching circuitry for switching the modes of operation from a first mode in which the first luminance is higher than the second luminance into a second mode in which the first luminance is lower than the second luminance, and vice versa.

Figure 6:
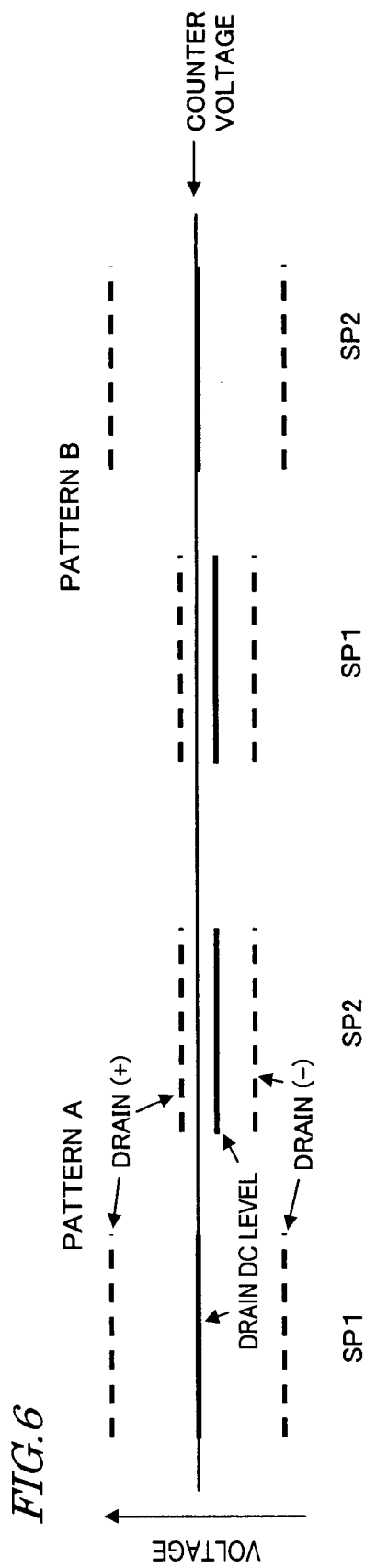
FIG. 6 shows how the DC components applied to the liquid crystal layer of subpixels are reduced in a liquid crystal display device according to a preferred embodiment of the present invention by showing drain voltage levels for the subpixels and counter electrode voltage levels.

FIG. 6 shows the DC levels of drain voltages for respective subpixels in Patterns A and B and the counter voltages (which will also be referred to herein as "counter levels") thereof. In the example shown in FIG. 6, the DC level of the drain voltage for the bright subpixel is equalized with the counter voltage.

As shown in FIG. 6, in Pattern A, the DC level of the drain voltage for the subpixel SP1 that is a bright subpixel agrees with the counter level. That is why the DC level of the drain voltage for the subpixel SP2 that is a dark subpixel is different from the counter level by the feedthrough voltage applied to the drain electrode and DC components are applied to the liquid crystal layer of the subpixel SP2. In Pattern B, on the other hand, the subpixel SP2 is a bright subpixel, and therefore, DC components are applied to the liquid crystal layer of the subpixel SP1 that is a dark subpixel.

By switching the modes of operation from Mode #1 in which a display operation is conducted in Pattern A into Mode #2 in which a display operation is conducted in Pattern B, and vice versa, the DC components are never applied continuously to one of the subpixels SP1 and SP2. In other words, the DC components are averaged between the subpixels SP1 and SP2. As a result, the reliability of the liquid crystal display device can be improved. It should be noted that the level relation between the DC level of the drain voltage and the counter level may be set (which will be sometimes referred to herein as "counter level setting") by regulating the display signal voltage to be applied as the drain voltage to the subpixel electrode and the counter voltage.

In the example shown in FIG. 6, the voltage level of the counter electrode is supposed to be equalized with the DC level of the drain voltage for the bright subpixel. However, the same effects are also achieved even by equalizing the counter level with the DC level of the drain voltage for the dark subpixel.

Figure 7:
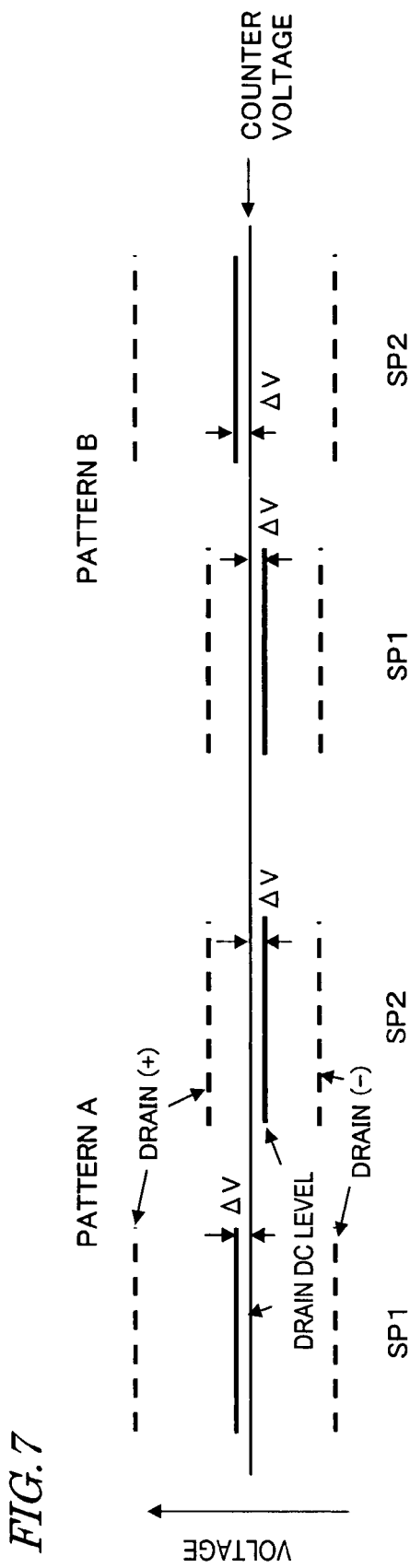
FIG. 7 shows how the DC components applied to the liquid crystal layer of subpixels are reduced in a liquid crystal display device according to another preferred embodiment of the present invention by showing drain voltage levels for the subpixels and counter electrode voltage levels.

Alternatively, the voltage level of the counter electrode may be set as exactly the intermediate level between the respective DC levels of drain voltages for the bright and dark subpixels as shown in FIG. 7.

If the level of the counter voltage is set as the intermediate level between the DC levels of respective drain voltages for the subpixels SP1 and SP2 that are a bright subpixel and a dark subpixel, respectively, according to Pattern A, then DC components of $+\Delta V$ are applied to the subpixel SP1 and DC components of $-\Delta V$ are applied to the subpixel SP2 as shown in FIG. 7.

According to Pattern B, on the other hand, the counter voltage is maintained at the same level as in Pattern A and the subpixels SP1 and SP2 are changed into a dark subpixel and a bright subpixel, respectively. As a result, contrary to Pattern A, DC components of $-\Delta V$ are applied to the subpixel SP1 and DC components of $+\Delta V$ are applied to the subpixel SP2.

If the modes of operation are switched between Mode #1 in which a display operation is conducted in this Pattern A and Mode #2 in which a display operation is conducted in this Pattern B, then the DC components applied to the liquid crystal layer of each of the subpixels SP1 and SP2 (i.e., the DC components generated during the display operation in Mode #1 and those generated during the display operation in Mode #2) cancel each other. As a result, the DC components are not applied anymore when averaged with time.

In the liquid crystal display device of the preferred embodiment described above, each pixel is supposed to be split into two subpixels. However, the present invention is also applicable to a situation where each pixel is divided into three or more subpixels. For example, if a pixel has been divided into three subpixels to have mutually different luminances, a subpixel with the highest luminance and another subpixel with the lowest luminance may be used as described above as the bright subpixel and the dark subpixel, respectively (with the other subpixel with the intermediate luminance fixed). Alternatively, if one of the three divided subpixels is used as a bright subpixel and the other two as dark subpixels (on the supposition that all of these subpixels will display the same luminance), then the drain voltage DC level of the two dark subpixels may be equalized with the counter level. Still alternatively, if one of the three divided subpixels is used as a dark subpixel and the other two as bright subpixels, then the drain voltage DC level of the two bright subpixels may be equalized with the counter level. In a situation where a pixel is divided into three subpixels, if the modes of operation are switched between three modes in which the display operation is conducted in three different patterns corresponding to the order of luminance of the respective subpixels in the pixel, then the DC components applied to the liquid crystal layer of each subpixel can be reduced. In any case, at least two subpixels included in a pixel have mutually different luminances and the display operation is conducted in two modes in which the level relation between these two subpixels is reversed.

The liquid crystal display device of this preferred embodiment may be characterized as follows.

In the liquid crystal display device of this preferred embodiment of the present invention, each pixel is split into a plurality of subpixels including two subpixels for conducting a display operation at mutually different luminances in response to at least one display signal voltage supplied. And the luminance switching circuitry switches the modes of operation between a plurality of modes in which one of the subpixels that has the highest luminance changes its locations within the pixel. For example, if each pixel is split into two subpixels in the column direction, then the modes of operation are switched between a mode in which the bright subpixel is arranged at the higher location and a mode in which the bright subpixel is arranged at the lower location. On the other hand, if each pixel is divided into three subpixels in the column direction, then the modes of operation are switched between a mode in which the bright subpixel is arranged at the highest location, a mode in which the bright subpixel is arranged at the intermediate location, and a mode in which the bright subpixel is arranged at the lowest location.

Figure 8:
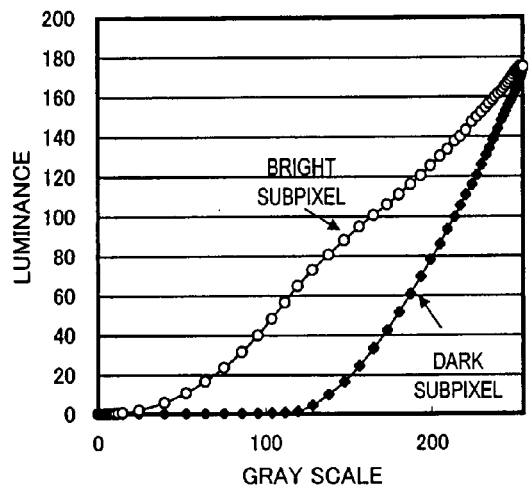
FIG. 8 is a graph showing how the difference in luminance between subpixels changes with the gray scale in an MVA mode liquid crystal display device according to a preferred embodiment of the present invention.
Figure 9:
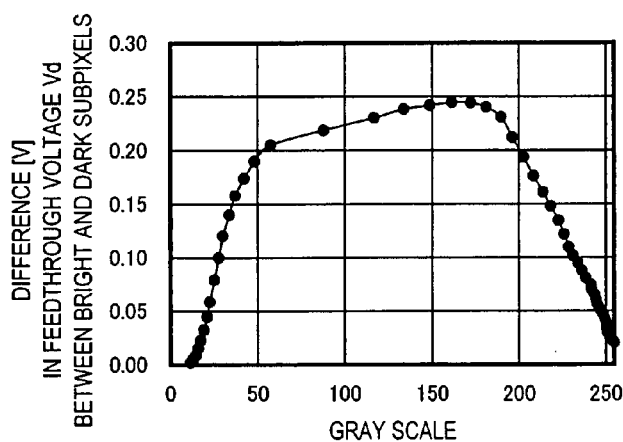
FIG. 9 is a graph showing how the difference in drain feedthrough voltage Vd between subpixels changes with the gray scale in an MVA mode liquid crystal display device according to a preferred embodiment of the present invention.

Generally speaking, in a VA mode liquid crystal display device, the γ characteristic lightly depends on the viewing angle at low and high gray scales, which are close to black and white, respectively, but depends heavily on the viewing angle at half scale tones. The pixel division structure shown in FIG. 2 can be used effectively to reduce the viewing angle dependence of the γ characteristic of vertical alignment (VA) mode LCDs such as MVA mode LCDs. If the pixel division structure shown in FIG. 2 is adopted for the MVA mode, then the difference in luminance between respective subpixels can be increased at half scale tones but decreased at low and high gray scales as shown in FIG. 8. That is why in this pixel division structure, the difference in drain feedthrough voltage Vd between the bright and dark subpixels is small at low and high gray scales but is large at half scale tones as shown in FIG. 9.

Figure 10:
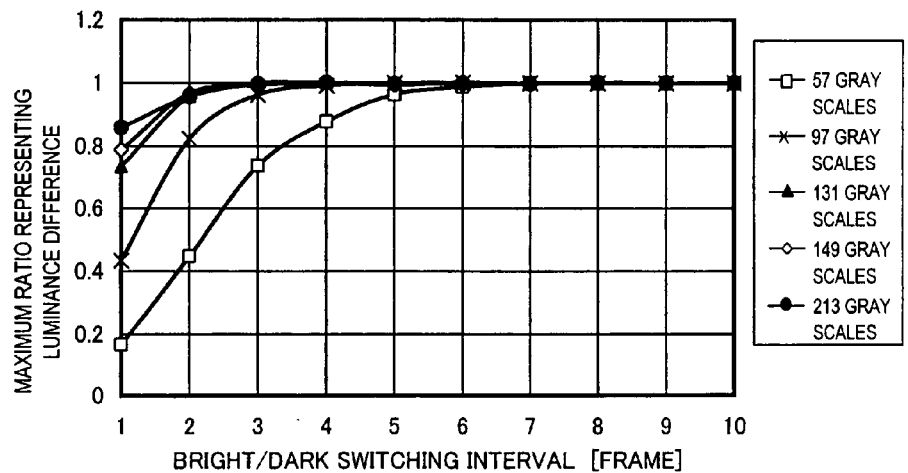
FIG. 10 is a graph showing how the maximum ratio representing the luminance difference between bright and dark subpixels changes at each display gray scale with the bright/dark mode switching interval in an MVA mode liquid crystal display device according to a preferred embodiment of the present invention.

FIG. 10 shows how the maximum ratio representing the luminance difference between bright and dark subpixels changes at each display gray scale with the bright/dark mode switching (i.e., switching between Mode #1 and Mode #2 described above) interval in an MVA mode liquid crystal display device with the pixel division structure shown in FIG. 2. In the example shown in FIG. 10, the device was driven at a frequency of 60 Hz and 1 frame period=16.7 ms. FIG. 10 shows results at half scale tones in which there was a significant difference in luminance between the bright and dark subpixels.

According to the pixel division technique, the viewing angle characteristic is improved by making up a pixel of a plurality of subpixels that have different luminances. That is why unless the difference in luminance between the bright and dark subpixels reaches a predetermined value, its effects are not achievable. As shown in FIG. 10, the maximum ratio representing the luminance difference does not exceed 90% until the switching interval becomes as long as two frames. In low gray scales in which the response is low, the maximum ratio does not exceed 90% until the switching interval becomes as long as five frames. That is why if the luminances of the bright and dark subpixels are switched every frame, the difference in luminance between the bright and dark subpixels would either decrease or disappear unless the response of liquid crystal molecules is complete within one frame. That is to say, in an ordinary liquid crystal display device such as an MVA mode LCD, the luminances of the bright and dark subpixels need to be switched at an interval of at least two frames, preferably five or more frames. It should be noted that the luminances do not have to be switched at regular time intervals (i.e., periodically). As long as the luminance switching interval is at least equal to two periods, and preferably five or more periods, the timings of switching may be defined arbitrarily. However, as described above, if the display periods were different between the respective modes (or luminance patterns), then the DC components could not be averaged or canceled sufficiently between the respective subpixels. For that reason, the overall display periods are preferably controlled so as to be equal to each other in respective modes. In the example described above, one frame is supposed to have a duration of 16.7 ms. If one frame (i.e., image rewriting period) is long, however, the modes may be switched every frame.

Next, the timing of switching the luminances of the bright and dark subpixels will be described in detail.

As described above, in the liquid crystal display device of this preferred embodiment of the present invention, the luminances of the respective subpixels are switched at an interval that is at least as long as two frames. This timing of luminance switching (i.e., mode switching) may be a constant time interval of two frames or more. Depending on the image being presented, however, the viewer may find it unnatural. To eliminate such unnaturalness, the bright and dark subpixels are preferably switched with a trigger pulled at any of the following timings A, B and C. A trigger signal is generated, if necessary, and the modes are switched, at one of the timings A, B and C without using a vertical sync signal Vsync or a horizontal sync signal Hsync:

A: The switching is done at a regular interval, which is not on a frame basis but in a relatively long span of 30 minutes or one hour, for example. If the switching is done frequently every several frames or seconds, then the viewer may feel the unnaturalness due to the mode switching more frequently. That is why the switching is preferably carried out at a relatively long interval.

B: The switching may be done when there is no or little difference in luminance between the bright and dark subpixels.

In the situation where there is little or no difference in luminance between the bright and dark subpixels, even if the modes are switched, the luminances of the respective pixels hardly change and therefore the viewer will not find the image unnatural. On an actual display screen, a totally white image or a totally black image is rarely presented. That is why the device may be set such that the switching is done only when the difference in luminance between the bright and dark subpixels is smaller than a predetermined value. As shown in FIG. 8, the difference in luminance between the bright and dark subpixels is small at low and high gray scales. For that reason, when the average of the gray scales displayed on the entire screen is equal to or greater (or smaller) than a particular gray scale, the modes are switched. For example, the average of the display gray scales may be calculated and the modes may be switched when a predetermined threshold value is reached (i.e., the threshold value may be used as trigger). As will be described later, the difference in luminance between the bright and dark subpixels changes with the CS voltage (amplitude voltage). That is why the threshold value to be a trigger for switching the modes may be determined appropriately by the CS voltage.

More specifically, the threshold value may be determined in the following manner, for example.

As a parameter for calculating the difference in luminance between the bright and dark subpixels and determining the threshold value, F given by the following equation may be used:

$$F = \Delta I / Iave$$

where $\Delta I$ is the difference in luminance between the bright and dark subpixels and Iave is the average of the luminances of the bright and dark subpixels.

Figure 11:
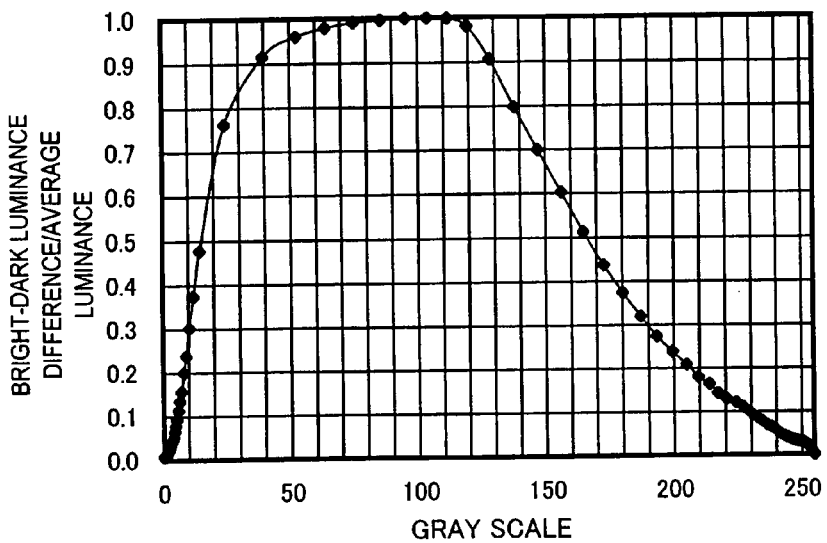
FIG. 11 is a graph showing the gray scale dependence of an F value, obtained by dividing the luminance difference between subpixels by an average luminance, in an MVA mode liquid crystal display device according to a preferred embodiment of the present invention.

FIG. 11 is a graph in which the F values are plotted as the ordinates and the gray scales are plotted as the abscissas. The F values are large at half scale tones of around gray scale 100, but decrease over and under these gray scales. That is to say, the F values decrease at lower gray scales and at higher gray scales.

The threshold luminance difference Fth is supposed to account for X % of the maximum F value Fmax as in the following equation:

$$Fth=X/100*Fmax \text{ (where * indicates multiplication)}$$

X defining this threshold value may be appropriately determined by the type or the driving condition of the given LCD panel.

As can be seen from FIG. 11, the F values are substantially constant at gray scales 50 to 120 but decrease sharply at less than gray scale 50 and at more than gray scale 120. Therefore, X=90% may be defined as the threshold value and preferably X=50%.

Supposing the threshold value at the lower gray scale is YthL and the threshold value at the higher gray scale is YthH when F=Fth, YthL=16 and YthH=166 in FIG. 11. The average gray scale Yave on the display screen is calculated. And if Yave≦YthL and Yave≧Yth, the modes are switched. For example, if the average Yave of the display gray scales on the entire screen satisfies Yave≦16 and Yave≧166, the modes may be switched.

C: If the images on the entire screen are changed in response to a predetermined instruction given by the operator (e.g., when the power is turned ON or OFF, when the channels are changed and when the input sources are changed) or if the input image signal has caused a predetermined variation (e.g., when a commercial message image is inserted), the images are changed entirely. That is why even if the bright and dark subpixels are switched, the viewer cannot tell the switching of the bright and dark subpixels from the change of the overall images, and therefore, does not find the switching unnatural.

As described above, if the display period in which the display operation is conducted in Mode #1 that adopts Pattern A (in which the subpixel SP1 is a bright subpixel and the subpixel SP2 is a dark subpixel) and the display period in which the display operation is conducted in Mode #2 that adopts Pattern B (in which the subpixel SP1 is a dark subpixel and the subpixel SP2 is a bright subpixel) are equal to each other, then the application of the DC components to the respective subpixels can be prevented most effectively. However, if the modes were switched (i.e., if the mode switching were triggered) at such timing, the display periods in the respective modes would not always be equal to each other. For that reason, the display periods of Patterns A and B are preferably counted with an integrating counter and the trigger signals generated under the conditions described above are selectively used so as to equalize the display periods with each other such that the longer the display periods, the smaller the difference between the display periods is. For example, a circuit for counting the amount of time that has passed since the modes were switched may be provided. And every time a predetermined amount of time passes, the modes may be switched. Alternatively, the modes may also be switched when the difference between the integrals of the operation times in Mode #1 and Mode #2 exceeds a predetermined value.

The modes of operation may be switched intentionally from Mode #1 into Mode #2, or vice versa, as described above. Alternatively, the modes of operation may also be switched by randomly selecting Modes #1 and #2. That is to say, at the timing specified above, Patterns A and B may be selected (or switched) randomly at a probability of ½. By switching the modes randomly, the overall display periods of the two modes can be equalized with each other when averaged with time. For example, every time the power is turned ON, either Mode #1 or Mode #2 may be selected at random at a probability of ½.

Hereinafter, a specific circuit configuration for switching the luminances in the liquid crystal display device of this preferred embodiment, having the pixel division structure shown in FIG. 2, will be described.

In the liquid crystal display device with the pixel division structure shown in FIG. 2, a display signal voltage is applied through the common source bus line 13 to the subpixel electrodes 11a and 11b to turn the TFTs 14a and 14b OFF. After that, if the voltages applied to the storage capacitor counter electrodes of the storage capacitors CS1 and CS2 (through the CS bus lines 15a and 15b, respectively) are varied in different directions and to different degrees, then the effective voltages applied to the liquid crystal capacitors of the subpixels SP1 and SP2 (i.e., the luminances) will be different from each other. Consequently, by inverting either the phases of the voltages applied to the storage capacitor counter electrodes of the respective subpixels SP1 and SP2 or the phase of the display signal voltage supplied to the subpixels SP1 and SP2, the luminances of the subpixels SP1 and SP2 can be switched (i.e., their luminance levels can be reversed).

Figure 12:
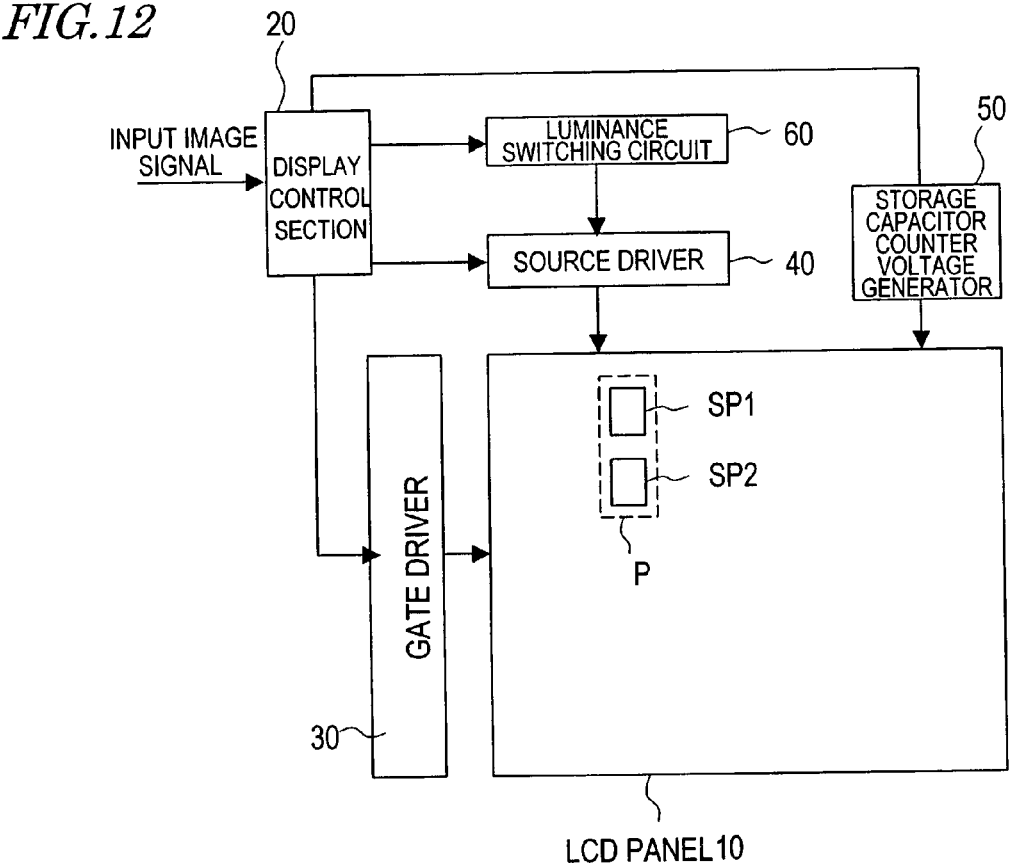
FIG. 12 is a schematic representation showing a circuit configuration for a liquid crystal display device according to a preferred embodiment of the present invention.

The liquid crystal display device of this preferred embodiment of the present invention may have the configuration shown in FIG. 12 to switch the modes of operation (or luminances).

The liquid crystal display device shown in FIG. 12 includes an LCD panel 10 in which each pixel P includes two subpixels SP1 and SP2, and a display control section 20, which receives an input image signal and supplies a predetermined drive signal to the LCD panel 10. The display control section 20 supplies predetermined signals to a gate driver 30, a source driver 40, a storage capacitor counter voltage generator 50 and a luminance switching circuit 60 at prescribed timings. In this preferred embodiment, the luminance switching circuit 60 generates a mode switching trigger signal, thereby inverting the phase of the display signal voltage (i.e., source voltage) to be applied from the source driver 40 to the LCD panel 10.

As the luminance switching circuit 60 shown in FIG. 12, the luminance switching circuit 60A shown in FIG. 13 is preferably used, for example.

The luminance switching circuit 60A includes a luminance switching signal generator 62, a polarity switching circuit 66, and an integrator 64. A source polarity control signal generator 20a may be included in the display control section 20 shown in FIG. 12, for example.

A horizontal sync signal Hsync and a vertical sync signal Vsync are input to the source polarity control signal generator 20a, thereby generating PolA and PolB signals with mutually opposite polarities (i.e., that have a phase difference of 180 degrees) as the display signal voltages. The polarity switching circuit 66 of the luminance switching circuit 60A outputs one of these two display signal voltages with opposite polarities to the source driver 40. By making this polarity selection based on the luminance switching signal, the modes of operation are switched.

The luminance switching signal generator 62 includes at least one trigger signal generator 62a and a signal generator 62b. If any of the conditions described above is satisfied, the trigger signal generator 62a generates a trigger signal. On receiving a predetermined signal from the integrator 64, the signal generator 62b outputs the luminance switching signal to the polarity switching circuit. That is to say, the signal generator 62b selectively passes the trigger signal according to the signal supplied from the integrator 64 and switches the modes of operation so as to equalize the sum of the operation times in respective modes with each other.

For example, if the average gray scale over the entire screen is calculated and found satisfying a predetermined threshold value, the trigger signal generator 62a outputs a trigger signal to the signal generator 62b. When switching the Pol signals to get Pattern B displayed, the polarity switching circuit 66 signals the integrator 64 to memorize the count of Pattern A, reset the counter and start counting the period in which Pattern B is displayed. If the count of Pattern B is less than the memorized one of Pattern A, the signal generator 62b does not output the luminance switching signal even on receiving the trigger signal. When the count of Pattern B agrees with the memorized one of Pattern A, the integrator 64 signals the signal generator 62b to get ready to generate the luminance switching signal (i.e., to enter a standby state). And when the trigger signal is supplied from the trigger signal generator 62a to the signal generator 62b in such a standby state, the luminance switching signal is input to the polarity switching circuit 66, thereby switching the Pol signals and getting Pattern A displayed. At the same time, the count of Pattern B is memorized, the counter is reset and counting of Pattern A gets started.

By repeatedly performing these operations, the display periods of Patterns A and B can be substantially equalized with each other. However, to improve the viewing angle characteristic by the pixel division, setting should be done such that Patterns A and B are switched at an interval of at least two frames.

A liquid crystal display device according to another preferred embodiment of the present invention switches the modes of operation (or luminances) by utilizing the configuration shown in FIG. 14, for example.

The liquid crystal display device shown in FIG. 14 includes a luminance switching circuit 60 for switching the modes of operation by inverting the phase of the storage capacitor counter voltage (CS voltage) generated by the storage capacitor counter voltage generator 50.

Figure 15A:
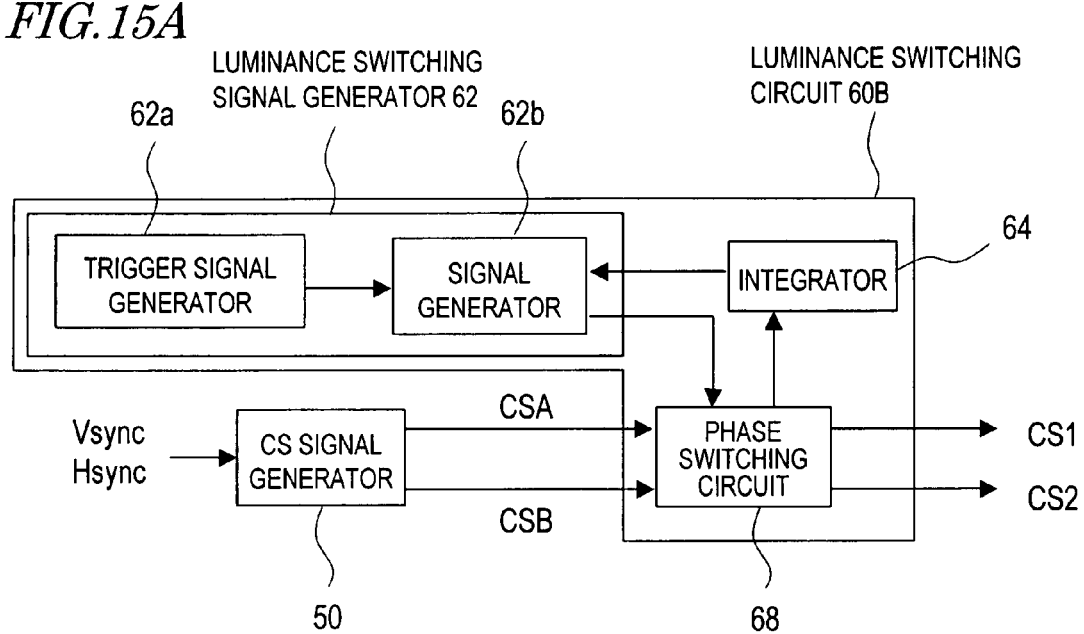
FIG. 15A is a schematic representation showing a configuration for a luminance switching circuit 60B, which can be used effectively as the luminance switching circuit 60 of the liquid crystal display device shown in FIG. 14.

As the luminance switching circuit 60 shown in FIG. 14, the luminance switching circuit 60B shown in FIG. 15A is preferably used, for example.

The luminance switching circuit 60B includes a luminance switching signal generator 62, an integrator 64 and a phase switching circuit 68. The luminance switching signal generator 62 includes at least one trigger signal generator 62a and a signal generator 62b. If any of the conditions described above is satisfied, the trigger signal generator 62a generates a trigger signal. On receiving a predetermined signal from the integrator 64, the signal generator 62b outputs the luminance switching signal to the polarity switching circuit. That is to say, the signal generator 62b selectively passes the trigger signal according to the signal supplied from the integrator 64 and switches the modes of operation so as to equalize the sum of the operation times in respective modes with each other.

In this case, the modes of operation are switched by inverting the phase of the CS signal.

A CS signal generator 50 generates CS signals (storage capacitor counter voltages) CSA and CSB with mutually different phases responsive to a horizontal sync signal Hsync and a vertical sync signal Vsync. These two CS signals with mutually different phases are transmitted to the storage capacitor line CS1 or CS2 of LCD panel by way of the phase switching circuit 68, which selectively outputs one of the CS signals CSA and CSB to the storage capacitor line CS1 or CS2, i.e., switches the modes of operation.

For example, if the average gray scale over the entire screen calculated by the integrator 64 satisfies the threshold value condition, the trigger signal generator 62a outputs the trigger signal to switch to the signal generator 62b.

When switching the CS signals to get Pattern B displayed, the phase switching circuit 68 signals the integrator 64 to memorize the count of Pattern A, reset the counter and start counting the period in which Pattern B is displayed. If the count of Pattern B is less than the memorized one of Pattern A, the signal generator 62b does not output the luminance switching signal even on receiving the trigger signal. When the count of Pattern B agrees with the memorized one of Pattern A, the integrator 64 signals the signal generator 62b to get ready to generate the luminance switching signal (i.e., to enter a standby state). And when the trigger signal is supplied to the signal generator 62b in such a standby state, the luminance switching signal is input to the phase switching circuit 68, thereby switching the phases of the CS signals and getting Pattern A displayed. At the same time, the count of Pattern B is memorized, the counter is reset and counting of Pattern A gets started. By repeatedly performing these operations, the display periods of Patterns A and B can be controlled so as to be substantially equal to each other. However, to improve the viewing angle characteristic by the pixel division, setting should be done such that Patterns A and B are switched at an interval of at least two frames. That is why if the trigger signal is generated at an interval of one frame, the CS signal should not be switched.

In the example described above, a configuration for switching the luminances by providing an additional luminance switching circuit 60 is supposed to be used. Alternatively, a circuit for switching the luminances may also be made up of known circuits.

Figure 15B:
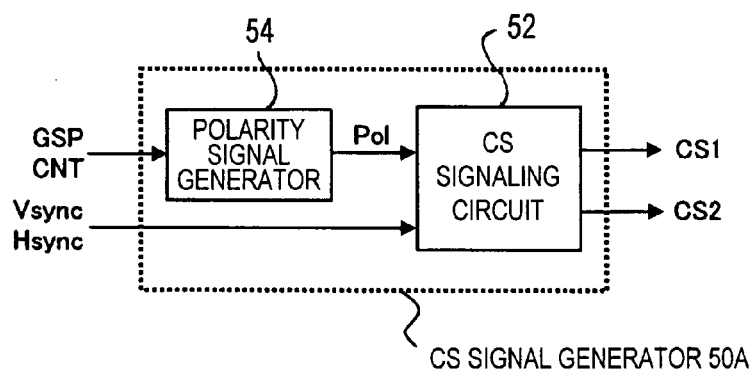
FIG. 15B is a schematic representation showing a configuration for a CS signal generator 50A with the function of the luminance switching circuit 60 of the liquid crystal display device shown in FIG. 14.
Figure 15C:
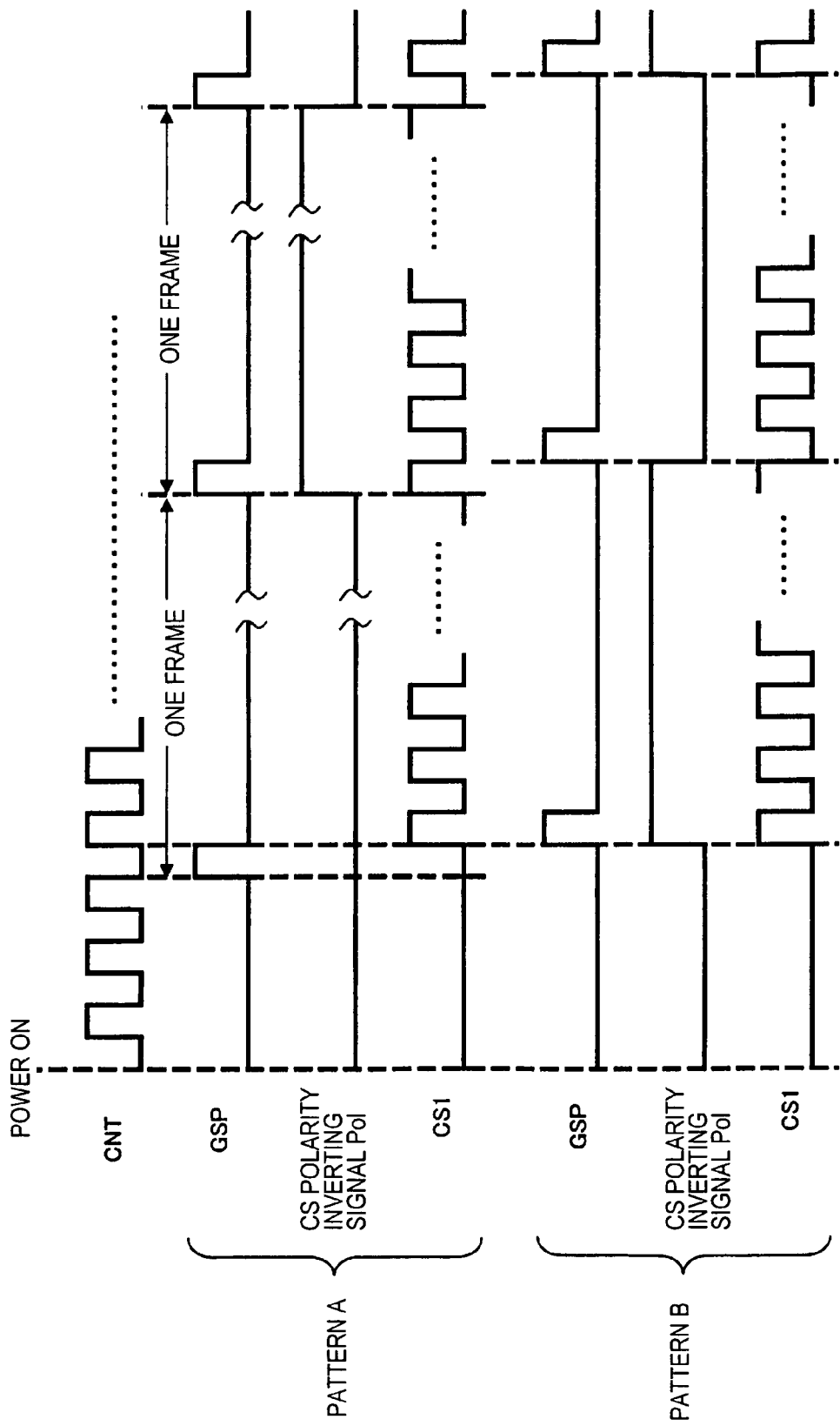
FIG. 15C shows the voltage waveforms of respective signals to describe how the CS signal generator 50A shown in FIG. 15B operates.

Next, the configuration and operation of a CS signal generator 50A, including the function of the luminance switching circuit 60 of the liquid crystal display device shown in FIG. 14, will be described with reference to FIGS. 15B and 15C. FIG. 15B is a schematic representation showing the configuration of the CS signal generator 50A and FIG. 15C shows the voltage waveforms of respective signals to describe how the CS signal generator 50A operates.

As shown in FIG. 15B, the CS signal generator 50A includes a CS signaling circuit 52 and a polarity signal generator 54. The CS signaling circuit 52 may generate an amplitude voltage that oscillates between two voltage levels (which will be also referred to herein as an "oscillating voltage"), for example.

The polarity signal generator 54 receives a gate start pulse GSP and a counter signal CNT and outputs a CS polarity inverting signal Pol. The counter signal CNT has a period that is sufficiently shorter than one frame and may be a gate clock signal, for example.

The CS signaling circuit 52 determines the polarity of the amplitude voltage by that represented by the CS polarity inverting signal Pol and outputs it as a CS signal.

Hereinafter, the timings of the respective signals will be described with reference to FIG. 15C.

When the power of the liquid crystal display device is turned ON, the counter signal CNT starts to be generated and input to the polarity signal generator 54. Thereafter, in an unfixed amount of time, the gate start pulse GSP is input to the polarity signal generator 54.

Patterns A and B have mutually different intervals between the turn ON of the power and the input of the gate start pulse GSP. In other words, either Pattern A or Pattern B is selected according to this time lag.

For example, according to Pattern A, if the counter signal CNT is L (low) when the gate start pulse GSP goes H (high), the initial state of the CS polarity inverting signal Pol is L.

After that, the CS polarity inverting signal Pol inverts its levels from L into H, or vice versa, every frame (i.e., every time the gate start pulse goes H).

On the other hand, according to Pattern B, if the counter signal CNT is H (high) when the gate start pulse GSP goes H (high), the initial state of the CS polarity inverting signal Pol is H. After that, the CS polarity inverting signal Pol inverts its levels from H into L, or vice versa, every frame (i.e., every time the gate start pulse goes H).

When the CS polarity inverting signal Pol defined in this manner is input to the CS signaling circuit 52, the polarity of the CS signal to be output is selected according to that of the CS polarity inverting signal Pol.

If the CS polarity inverting signal Pol supplied to the CS signaling circuit 52 has Pattern A as shown in FIG. 15C, a CS signal, of which the polarity is defined only by Pattern A, is output to the CS bus line CS1 (e.g., the CS bus line 15a connected to the subpixel SP1 shown in FIG. 2). On the other hand, if the CS polarity inverting signal Pol supplied to the CS signaling circuit 52 has Pattern B, a CS signal, of which the polarity is defined only by Pattern B, is output to the CS bus line CS1 (e.g., the CS bus line 15a connected to the subpixel SP1 shown in FIG. 2). Meanwhile, in both of Patterns A and B, a signal, of which the polarity is inverse to that of the CS signal output to the CS bus line CS1, is output to the other CS bus line CS2 (e.g., the CS bus line 15b connected to the subpixel SP2 shown in FIG. 2).

According to such a configuration, the period of time after the power was turned ON and before the gate start pulse GSP is input to the polarity signal generator 54 is not fixed, and therefore, the counter signal CNT is sometimes H and sometimes L when the gate start pulse GSP is H. That is to say, the level of the counter signal CNT is determined at random. That is why it is also randomly determined whether the pattern to be selected is Pattern A or Pattern B. And the probability of selection is ½ for each of these patterns.

Consequently, if a liquid crystal display device with such luminance switching circuitry is used for a long time, the overall display periods of these two modes become equal to each other when averaged with time.

This configuration for switching the luminances at random is also applicable to a configuration for switching the luminances by changing the polarities of the source signal voltage.

Hereinafter, a preferred embodiment of a normally black MVA mode liquid crystal display device using a negative liquid crystal material will be described.

Embodiment 1

As shown in FIG. 2, a liquid crystal display device according to this preferred embodiment is an active-matrix-addressed LCD with a pixel structure in which each pixel is divided into a plurality of subpixels. In the example shown in FIG. 2, a single pixel is split into two subpixels. However, a single pixel may also be split into three or more subpixels.

Figure 16:
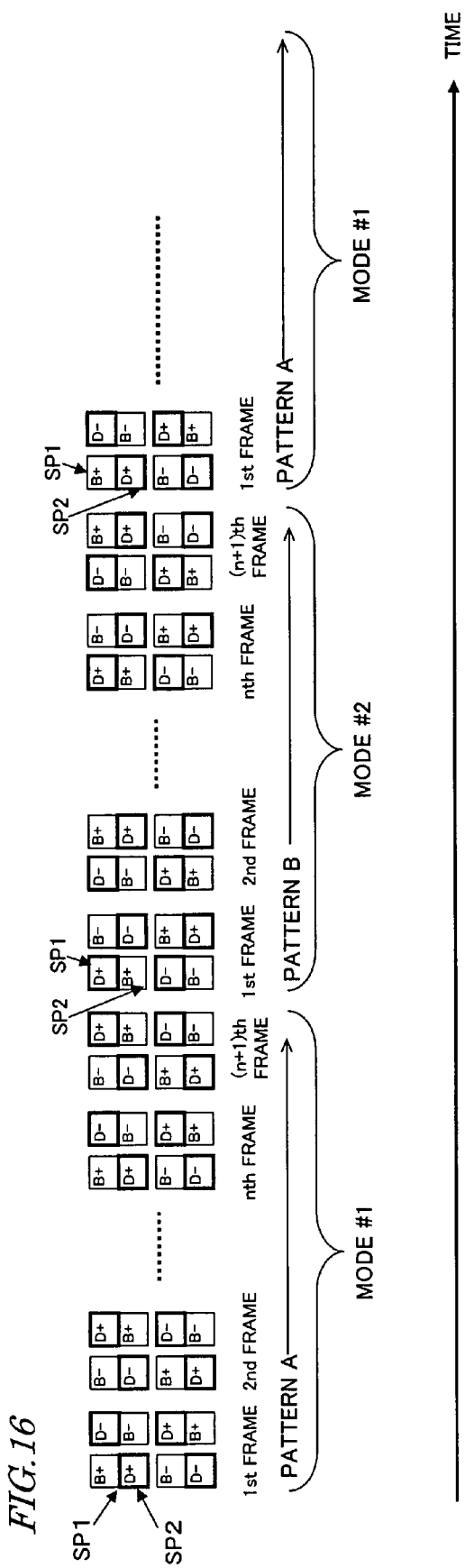
FIG. 16 shows the display state (operation state) of a liquid crystal display device according to a first preferred embodiment of the present invention.

As shown in FIG. 16, a display pattern in which subpixels SP1 are bright subpixels and subpixels SP2 are dark subpixels will be referred to herein as "Pattern A", a display pattern of which the bright and dark elements are interchanged (i.e., the subpixels SP1 are dark subpixels and the subpixels SP2 are bright subpixels) will be referred to herein as "Pattern B", and these Patterns A and B are switched alternately.

Hereinafter, the driving method will be described with reference to FIG. 17, which shows an equivalent circuit of the liquid crystal display device, and FIGS. 18 and 19, which show application timings of voltages to respective bus lines. In this preferred embodiment, the LCD is driven such that one frame=16.7 ms.

Figure 18:
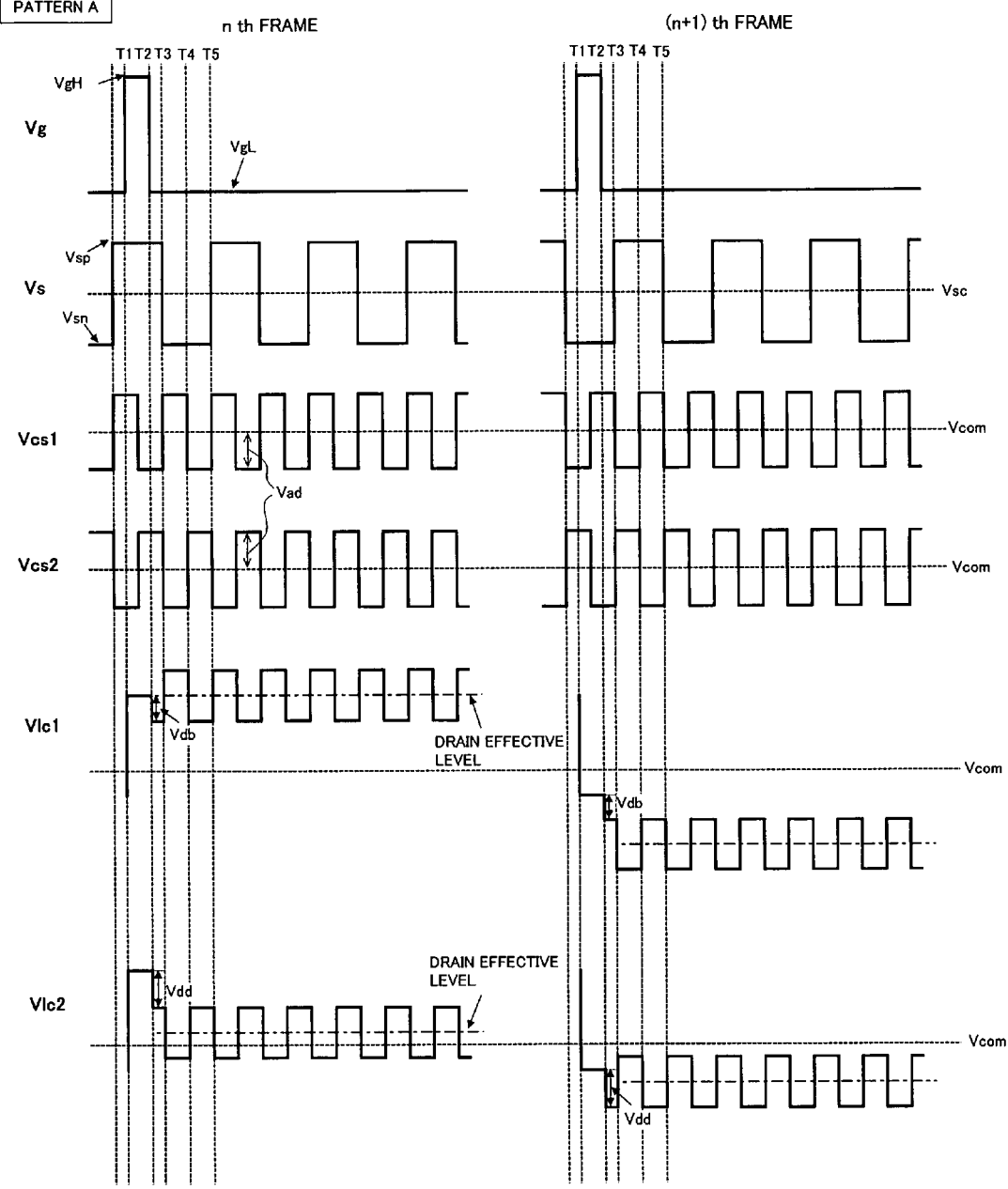
FIG. 18 shows the voltage waveforms of respective signals for driving the liquid crystal display device shown in FIG. 17 and their application timings according to Pattern A.

In Pattern A shown in FIG. 18, the application timings of voltages to respective bus lines are determined such that the subpixels SP1 become bright subpixels and the subpixels SP2 become dark subpixels. On the other hand, in Pattern B shown in FIG. 19, the application timings of voltages to respective bus lines are determined such that the subpixels SP1 become dark subpixels and the subpixels SP2 become bright subpixels. Vg denotes the gate voltage, Vs denotes the source voltage, Vcs1 and Vcs2 denote the voltages applied to the storage capacitors of the subpixels SP1 and SP2, and Vlc1 and Vlc2 denote the voltages applied to the pixel electrodes of the subpixels SP1 and SP2, respectively. In general, alternate current drive such as frame inversion, line inversion or dot inversion is carried out so as not to produce polarization in the liquid crystal layer.

Figure 19:
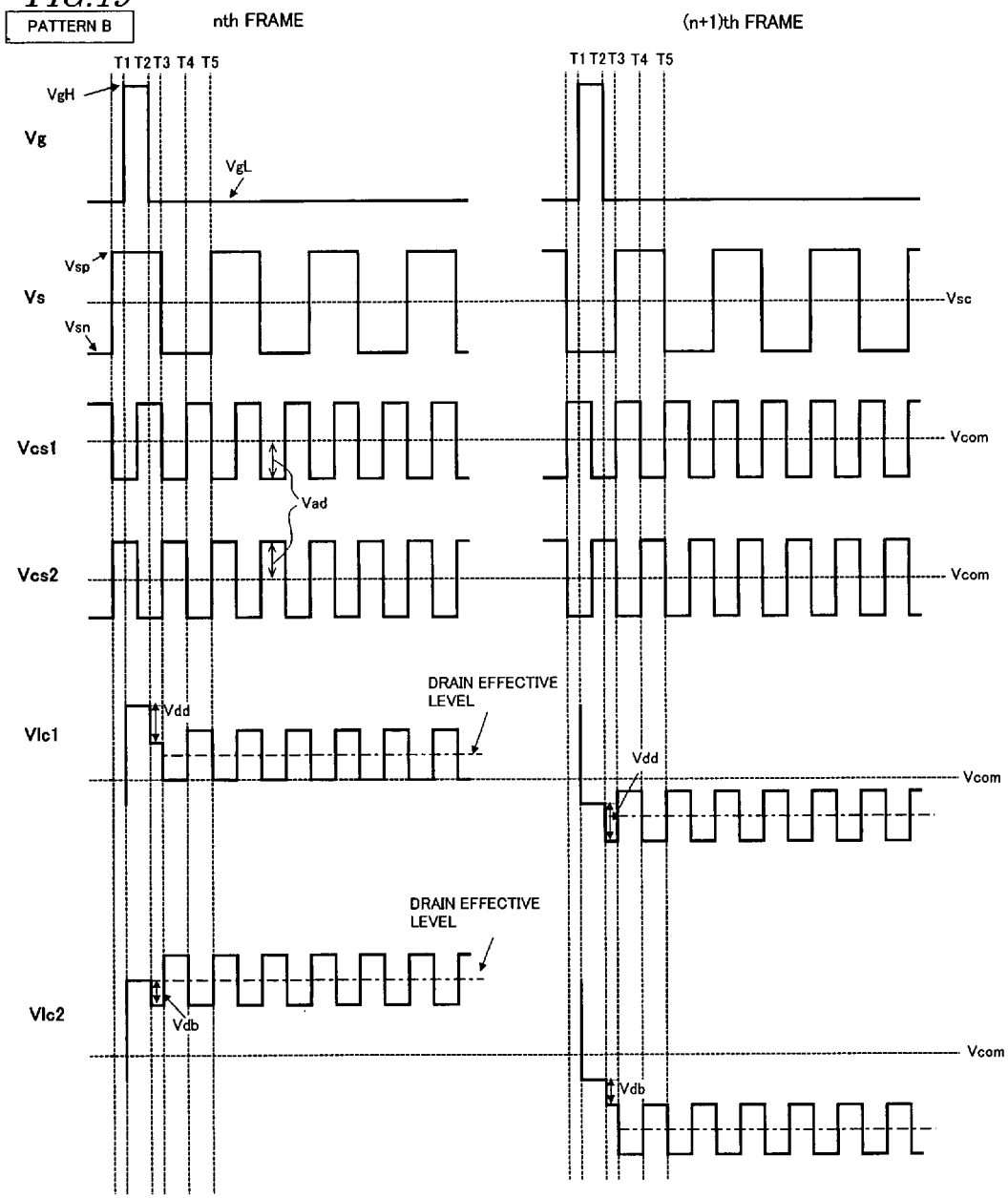
FIG. 19 shows the voltage waveforms of respective signals for driving the liquid crystal display device shown in FIG. 17 and their application timings according to Pattern B.

In this preferred embodiment, a source voltage Vsp is applied in the $n^{th}$ frame as a positive source voltage with respect to the center value Vsc of the source voltage, a source voltage Vsn is applied in the next $(n+1)^{th}$ frame as a negative source voltage with respect to the center value Vsc of the source voltage as shown in FIGS. 18 and 19, and the dot inversion is carried out every frame as shown in FIG. 16. To CS1 and CS2, signals, of which the voltages oscillate with the amplitude Vad and which have a phase difference of 180 degrees, are input.

Hereinafter, it will be described with respect to Pattern A shown in FIG. 18 how the voltages of respective signals change in the $n^{th}$ frame with time.

First, at a time T1, Vg rises from VgL to VgH to turn the TFTs of the two subpixels ON. As a result, the subpixels SP1 and SP2 and the storage capacitors CS1 and CS2 are charged with the voltage Vsp.

Next, at a time T2, Vg falls from VgH to VgL to turn the TFTs of the two subpixels OFF and electrically isolate the subpixels SP1 and SP2 and the storage capacitors CS1 and CS2 from the source bus line. It should be noted that immediately after that, feedthrough voltages Vdb and Vdd are generated in the subpixels SP1 and SP2, respectively, due to the feedthrough phenomenon caused by a parasitic capacitance, for example. As a result, the voltages applied to the respective subpixels now are:

$$Vlc1 = Vsp - Vdb$$

$$Vlc2 = Vsp - Vdd$$

respectively. The feedthrough voltages Vdb and Vdd will be described in detail later.

Also, in this case, $$Vcs1 = Vcom - Vad$$

$$Vcs2 = Vcom + Vad$$

are satisfied.

Next, at a time T3, the voltage Vcs1 on the storage capacitor bus line CS1 rises from Vcom−Vad to Vcom+Vad and the voltage Vcs2 on the storage capacitor bus line CS2 falls from Vcom+Vad to Vcom−Vad. In this case, the pixel voltages Vlc1 and Vlc2 applied to the respective subpixels are:

$$Vlc1 = Vsp - Vdb + 2*K*Vad$$

$$Vlc2 = Vsp - Vdd - 2*K*Vad$$

respectively, where K=Ccs/(Clc(V)+Ccs).

Next, at a time T4, Vcs1 falls from Vcom+Vad to Vcom−Vad and Vcs2 rises from Vcom−Vad to Vcom+Vad. In this case, the subpixel voltages Vlc1 and Vlc2 are:

$Vlc1 = Vsp - Vdb$ $Vlc2 = Vsp - Vdd$ respectively.

Next, at a time T5, Vcs1 rises from Vcom−Vad to Vcom+Vad and Vcs2 falls from Vcom+Vad to Vcom−Vad. In this case, the subpixel voltages Vlc1 and Vlc2 are:

$Vlc1 = Vsp - Vdb + 2*K*Vad$ $Vlc2 = Vsp - Vdd - 2*K*Vad$ respectively.

After that, until writing is performed when Vg=VgH, the voltages Vcs1, Vcs2, Vlc1 and Vlc2 alternate their levels at the times T4 and T5 every time a period of time that is an integral number of times as long as one horizontal write period 1H has passed. Consequently, the effective values of Vlc1 and Vlc2 become:

$Vlc1 = Vsp - Vdb + K*Vad$ $Vlc2 = Vsp - Vdd - K*Vad$ respectively.

In the $n^{th}$ frame, the effective voltages applied to the liquid crystal layers of the respective subpixels are:

$V1 = Vsp - Vdb + K*Vad - Vcom$ (2)

$V2 = Vsp - Vdd - K*Vad - Vcom$ (3)

Consequently, the subpixel SP1 becomes the bright subpixel and the subpixel SP2 becomes the dark subpixel.

Hereinafter, it will be described how the voltages of respective signals change in the $(n+1)^{th}$ frame with time according to Pattern A shown in FIG. 18.

In the $(n+1)^{th}$ frame, the polarity is inverted, and therefore, Vs is inverted, too. For that purpose, at the time T1, Vg rises from VgL to VgH to turn the TFTs of the two subpixels ON. As a result, the storage capacitors CS1 and CS2 are charged with the voltage Vsn.

Next, at the time T2, the TFTs of the two subpixels are turned OFF and immediately after that, feedthrough voltages Vdb and Vdd are generated in the subpixels SP1 and SP2, respectively, as in the $n^{th}$ frame. As a result, the voltages applied to the respective subpixels now are:

$Vlc1 = Vsn - Vdb$ $Vlc2 = Vsn - Vdd$

Next, at the time T3, the voltage Vcs1 on the storage capacitor bus line CS1 falls from Vcom+Vad to Vcom−Vad and the voltage Vcs2 on the storage capacitor bus line CS2 rises from Vcom−Vad to Vcom+Vad. In this case, the pixel voltages Vlc1 and Vlc2 applied to the respective subpixels are:

$Vlc1 = Vsn - Vdb - 2*K*Vad$ $Vlc2 = Vsn - Vdd + 2*K*Vad$

Next, at the time T4, Vcs1 rises from Vcom−Vad to Vcom+Vad and Vcs2 falls from Vcom+Vad to Vcom−Vad. In this case, the subpixel voltages Vlc1 and Vlc2 are:

$Vlc1 = Vsn - Vdb$ $Vlc2 = Vsn - Vdd$ respectively.

Next, at the time T5, Vcs1 falls from Vcom+Vad to Vcom−Vad and Vcs2 rises from Vcom−Vad to Vcom+Vad. In this case, the subpixel voltages Vlc1 and Vlc2 are:

$Vlc1 = Vsn - Vdb - 2*K*Vad$ $Vlc2 = Vsn - Vdd + 2*K*Vad$ respectively.

After that, the voltages Vcs1, Vcs2, Vlc1 and Vlc2 alternate their levels at the times T4 and T5 as in the $n^{th}$ frame. Consequently, the effective values of Vlc1 and Vlc2 become:

$Vlc1 = Vsn - Vdb - K*Vad$ $Vlc2 = Vsn - Vdd + K*Vad$ respectively.

In the $(n+1)^{th}$ frame, the effective voltages applied to the liquid crystal layers of the respective subpixels are:

$V1 = Vsn - Vdb - K*Vad - Vcom$ (4)

$V2 = Vsn - Vdd + K*Vad - Vcom$ (5)

Consequently, the subpixel SP1 becomes the bright subpixel and the subpixel SP2 becomes the dark subpixel.

The DC voltages that are applied to the pixel electrodes of the subpixels SP1 and SP2 as positive and negative voltages in the $n^{th}$ frame and the $(n+1)^{th}$ frame, respectively, are:

$V1dc = Vsc - Vdb$ (6)

$V2dc = Vsc - Vdd$ (7)

where Vsc is the center value of the source voltage and Vsc= (Vsp+Vsn)/2.

The feedthrough voltages Vdb and Vdd generated at the time T2 in the subpixels SP1 and SP2 will be described. As can be seen from Equation (1), the feedthrough voltage is influenced by the liquid crystal capacitance Clc (V). When the voltage applied to the liquid crystal layer changes, the liquid crystal molecules with dielectric anisotropy change their orientation directions, thus varying Clc (V). At the time T2, the voltages at the respective subpixel electrodes of the subpixels SP1 and SP2 are Vsp in the $n^{th}$ frame and Vsn in the $(n+1)^{th}$ frame. That is why if the liquid crystal molecules respond and complete their transition within $\Delta T=T2-T1$, the respective liquid crystal capacitances will satisfy Clc1 (V)=Clc2 (V), and therefore, Vdb=Vdd as can be seen from Equation (1).

However, the duration $\Delta T$ of VgH is as short as just 10 μs, whereas the response of liquid crystal molecules is on the order of several milliseconds. That is why the liquid crystal molecules cannot complete their response within $\Delta T$ and have not yet made a transition from the previous state (i.e., the state before T1) at the time T2. According to Pattern A of this preferred embodiment, the subpixel SP1 is a bright subpixel and the subpixel SP2 is a dark subpixel. For that reason, Vlc1>Vlc2 is satisfied. And liquid crystal molecules with negative dielectric anisotropy (i.e., negative liquid crystal material) satisfy Clc1 (V)>Clc2 (V). Consequently, even at the time T2, Clc1 (V)>Clc2 (V) is also satisfied and Vdb<Vdd is met as can be seen from Equation (1).

Therefore, the DC voltages V1dc and V2dc of the voltages applied to the pixel electrodes of the subpixels SP1 and SP2 satisfy V1dc>V2dc as can be seen from Equations (6) and (7).

If the counter voltage Vcom is equalized with the DC voltage V1dc of the voltage applied to the pixel electrode of the subpixel SP1, then $V1dc = Vcom = Vsc - Vdb$ is satisfied.

On the other hand, V2dc<Vcom is also satisfied. That is why if the subpixels SP1 and SP2 are continuously displayed as bright and dark subpixels, respectively, then the drain voltage DC level of the subpixel SP1 will soon get equal to the counter level and the drain voltage DC level of the subpixel SP2 will soon-become different from the counter level.

To switch the images into Pattern B in at least two frames, both of the input signals Vcs1 and Vcs2 for the CS have their phases shifted 180 degrees as shown in FIG. 19. In this case, the effective values of Vlc1 and Vlc2 in the $n^{th}$ frame are:

$$Vlc1 = Vsp - Vdd - K*Vad$$

$$Vlc2 = Vsp - Vdb + K*Vad$$

respectively. On the other hand, the effective values of Vlc1 and Vlc2 in the $(n+1)^{th}$ frame are:

$$Vlc1 = Vsn - Vdd + K*Vad$$

$$Vlc2 = Vsn - Vdb - K*Vad$$

respectively.

The DC voltages that are applied to the pixel electrodes of the subpixels SP1 and SP2 as positive and negative voltages in the $n^{th}$ frame and the $(n+1)^{th}$ frame, respectively, are:

$$V1dc = Vsc - Vdd \quad (8)$$

$$V2dc = Vsc - Vdb \quad (9)$$

According to Pattern B, the subpixel SP1 is a dark subpixel and the subpixel SP2 is a bright subpixel, and therefore, Vlc1<Vlc2. In the negative liquid crystal material, Clc1 (V)<Clc2 (V) is satisfied. Therefore, at the time T2, Clc1 (V)<Clc2 (V) is also satisfied and Vdd>Vdb as can be seen from Equation (1).

The counter voltage is given by Vcom=Vsc−Vdb, and therefore, equal to V2dc. According to Pattern B in which the subpixels SP1 and SP2 are displayed as a dark subpixel and a bright subpixel, respectively, the drain voltage DC level of the subpixel SP2 agrees with the counter level, but that of the subpixel SP1 disagrees with the counter level.

By repeatedly displaying Patterns A and B alternately, it is possible to prevent the DC voltage from being applied continuously to one of the two subpixels as can be seen from the relation between the drain voltage DC level and the counter voltage shown in FIG. 6. The same effects are also achieved even when Vcom=Vsc−Vdd.

To improve the viewing angle characteristic significantly by the pixel division technique, Patterns A and B are preferably switched at a time interval of at least two frames. Also, if the switching is done frequently, then the viewer may feel unnaturalness. That is why the switching should not be done every several frames or seconds. For example, the switching interval is set to be one hour according to this preferred embodiment. It is naturally possible to switch the modes of operation at the timings defined by the conditions B or C by using the configuration that has been described with reference to FIGS. 14, 15A and 15B.

Embodiment 2

Figure 17:
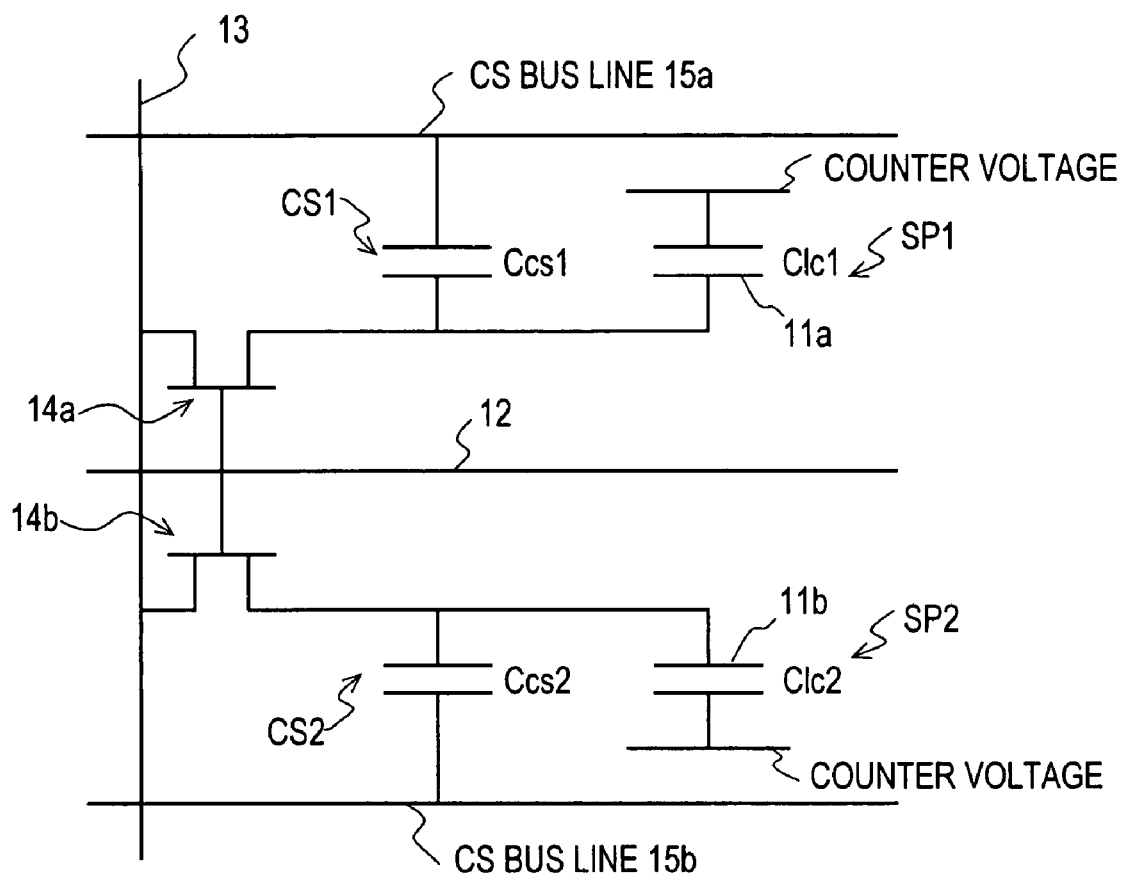
FIG. 17 shows an equivalent circuit of a liquid crystal display device according to a first preferred embodiment of the present invention.
Figure 20:
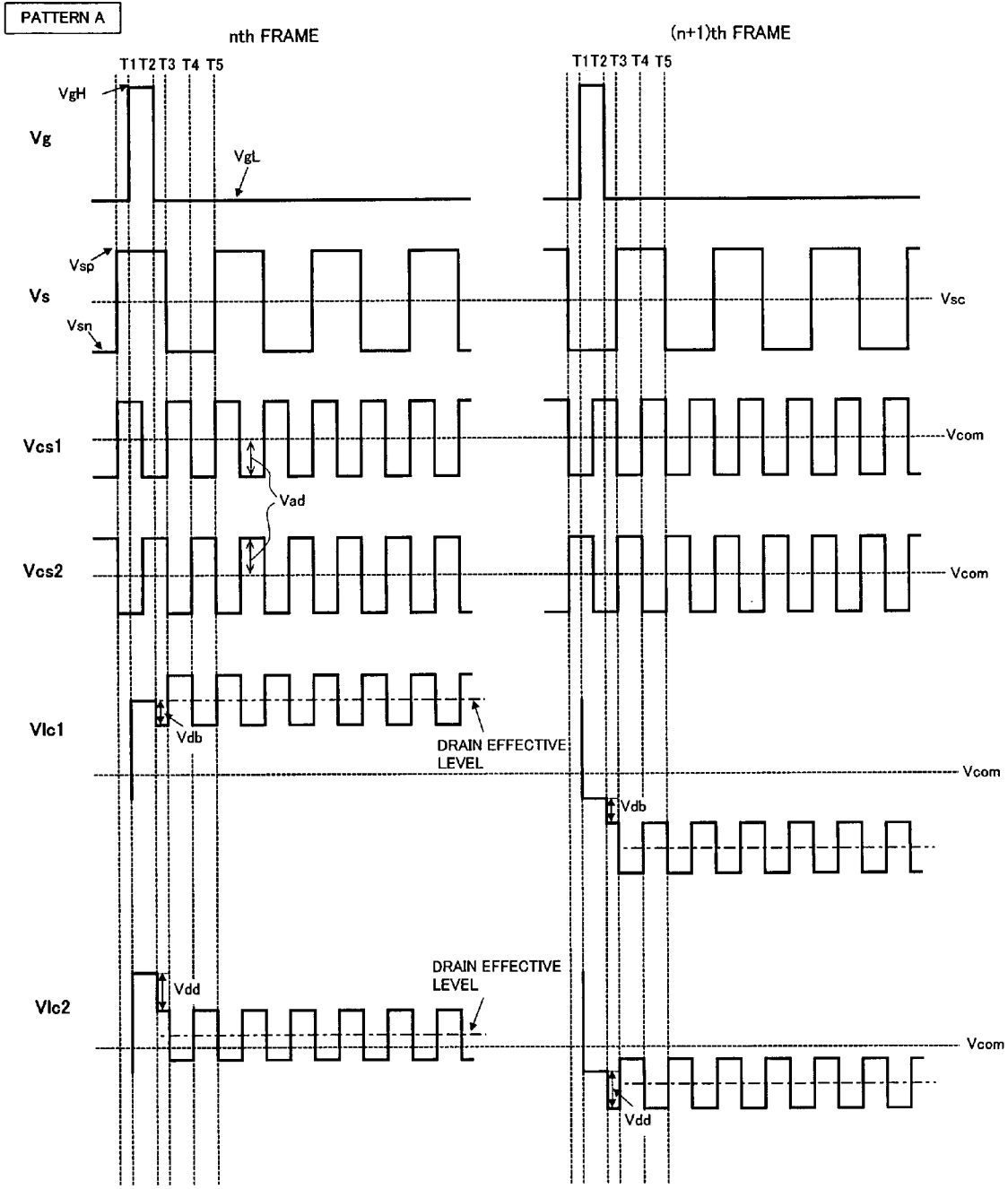
FIG. 20 shows the voltage waveforms of respective signals for driving a liquid crystal display device according to a second preferred embodiment of the present invention and their application timings according to Pattern A.
Figure 21:
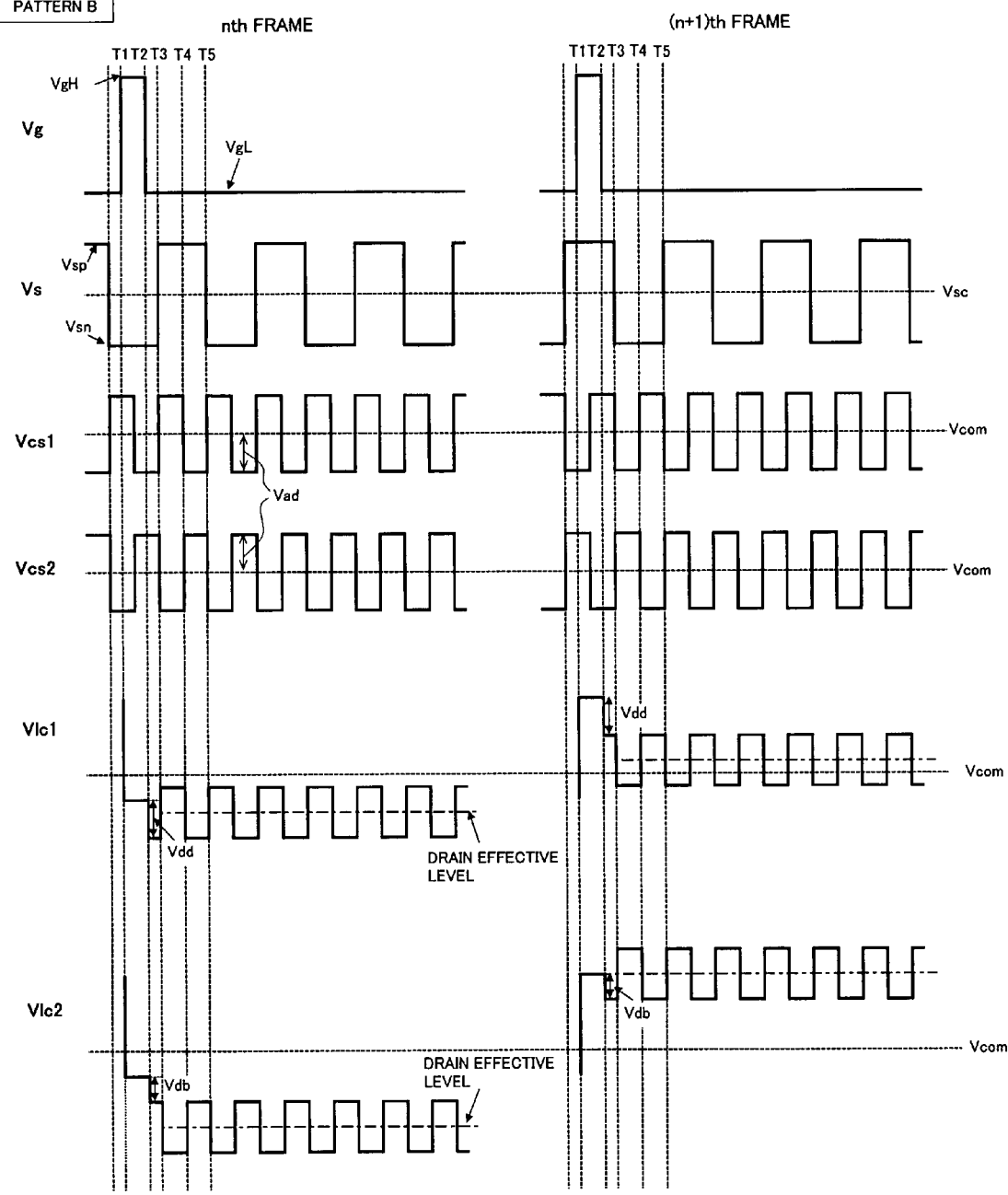
FIG. 21 shows the voltage waveforms of respective signals for driving the liquid crystal display device of the second preferred embodiment of the present invention and their application timings according to Pattern B.

A liquid crystal display device according to a second preferred embodiment of the present invention has substantially the same configuration as the counterpart of the first preferred embodiment shown in FIG. 17, and the detailed description thereof will be omitted herein. In this preferred embodiment, the bright and dark subpixels in Patterns A and B shown in FIG. 16 are switched by changing the polarities of a source signal. The voltage waveforms of respective signals in Patterns A and B are shown in FIGS. 20 and 21, respectively. In FIGS. 20 and 21, the same reference signs as those of the first preferred embodiment are used. In this preferred embodiment, the device is driven such that one frame=16.7 ms as in the first preferred embodiment described above.

As shown in FIG. 20, according to Pattern A, a source signal Vsp is input in the $n^{th}$ frame and a source signal Vsn is input in the $(n+1)^{th}$ frame. Therefore, the effective values of Vlc1 and Vlc2 in the $n^{th}$ frame are:

$$Vlc1 = Vsp - Vdb + K*Vad$$

$$Vlc2 = Vsp - Vdd - K*Vad$$

respectively. On the other hand, the effective values of Vlc1 and Vlc2 in the $(n+1)^{th}$ frame are:

$$Vlc1 = Vsn - Vdb - K*Vad$$

$$Vlc2 = Vsn - Vdd + K*Vad$$

respectively. Consequently, according to Pattern A, the subpixel SP1 is a bright subpixel and the subpixel SP2 is a dark subpixel.

As shown in FIG. 21, according to Pattern B, a source signal Vsn is input in the $n^{th}$ frame and a source signal Vsp is input in the $(n+1)^{th}$ frame. Therefore, the effective values of Vlc1 and Vlc2 in the $n^{th}$ frame are:

$$Vlc1 = Vsn - Vdd + K*Vad$$

$$Vlc2 = Vsn - Vdb - K*Vad$$

respectively. On the other hand, the effective values of Vlc1 and Vlc2 in the $(n+1)^{th}$ frame are:

$$Vlc1 = Vsp - Vdd - K*Vad$$

$$Vlc2 = Vsp - Vdb + K*Vad$$

respectively. Consequently, according to Pattern B, the subpixel SP1 is a dark subpixel and the subpixel SP2 is a bright subpixel.

According to Pattern A, the DC voltages of Vlc1 and Vlc2 of the subpixels SP1 and SP2 are:

$$V1dc = Vsc - Vdb$$

$$V2dc = Vsc - Vdd$$

respectively. On the other hand, according to Pattern B, the respective DC voltages of Vlc1 and Vlc2 of the subpixels SP1 and SP2 are:

$$V1dc = Vsc - Vdd$$

$$V2dc = Vsc - Vdb$$

where Vsc is the center value of the source voltage and Vsc= (Vsp+Vsn)/2. Also, Vdb<Vdd is satisfied as already described for the first preferred embodiment.

If the counter voltage Vcom satisfies Vcom=V1dc=Vsc−Vdb, then the subpixel SP1 has the best counter voltage but the subpixel SP2 does not according to Pattern A. When the patterns are changed into Pattern B, the subpixel SP1 no longer has the best counter voltage and the subpixel SP2 does have it. As a result, it is possible to prevent the DC voltage from being applied continuously to one of the two subpixels. The same effects are also achieved even if Vcom=V2dc.

The mode switching by inverting the source polarity may be carried out by using the luminance switching circuit 60 that has already been described with reference to FIGS. 12 and 13.

Also, according to this preferred embodiment, the polarity of the source signal is inverted every frame to perform dot inversion drive. If Patterns A and B are switched with the polarity of the source signal inverted, the polarity is not inverted due to the dot inversion only when the patterns are switched. That is why in order to prevent the DC voltage from being applied and minimize the flicker by the dot inversion technique as effectively as possible, Patterns A and B should not be switched so frequently. For that reason, the switching interval is set to be at least equal to 30 minutes according to this preferred embodiment. Naturally, the modes of operation may also be switched at the timings defined by the condition B or C described above.

Embodiment 3

Figure 22:
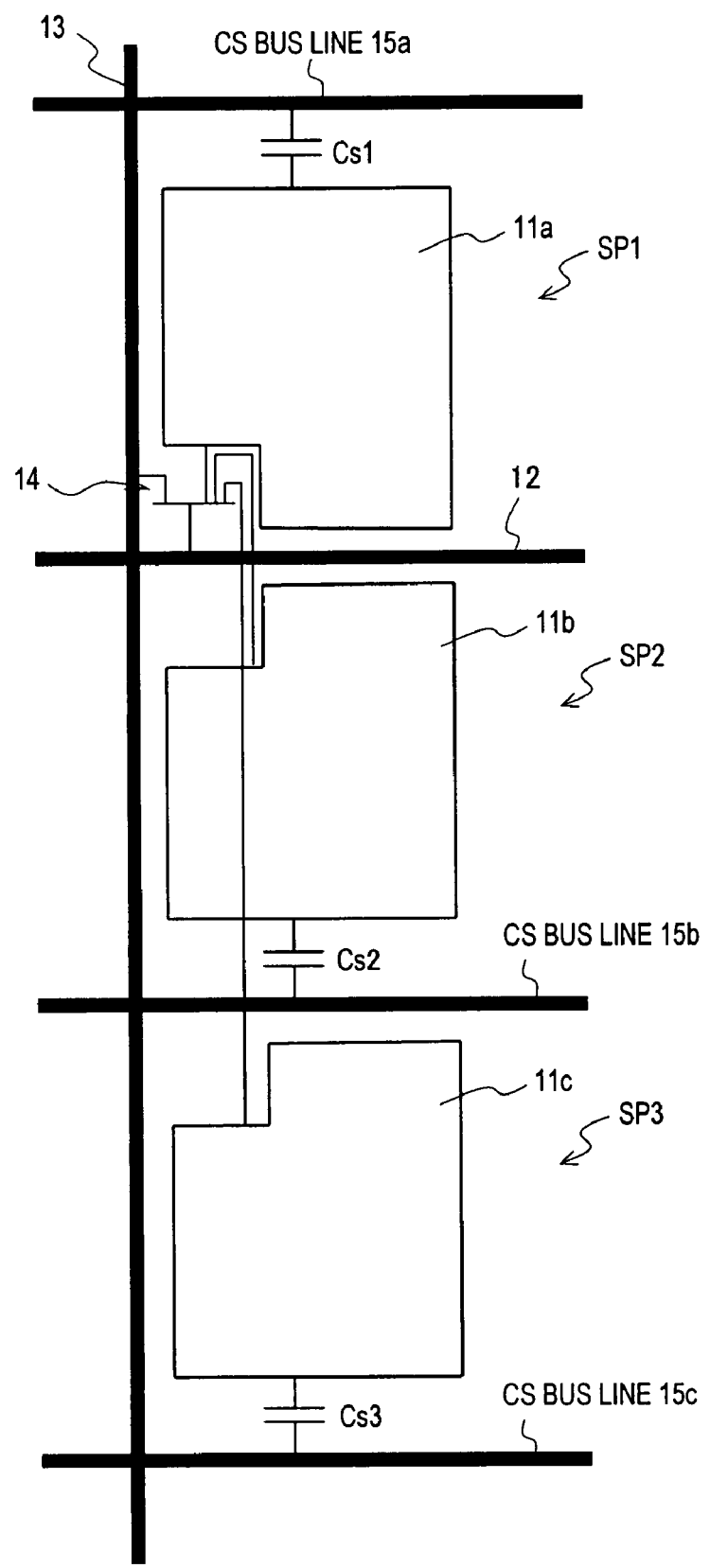
FIG. 22 is a schematic representation showing the pixel division structure of a liquid crystal display device according to a third preferred embodiment of the present invention.
Figure 23:
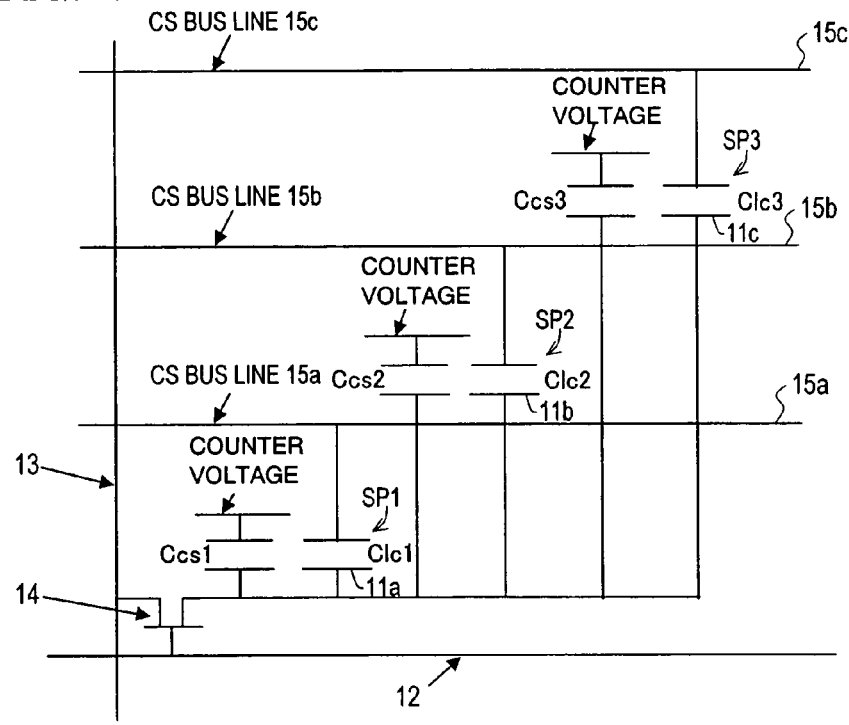
FIG. 23 shows an equivalent circuit of the liquid crystal display device of the third preferred embodiment of the present invention.

In a liquid crystal display device according to a third preferred embodiment of the present invention, one pixel is divided into three subpixels as shown in FIG. 22. The three subpixels are driven using a single gate bus line and a single source bus line as shown in the equivalent circuit diagram of FIG. 23. As in the first and second preferred embodiments described above, the voltages applied to the respective subpixels are varied by changing the amplitude voltages on the CS bus lines. Generally speaking, the greater the number of subpixels, the better the viewing angle characteristic but the lower the transmittance. That is to say, if the number of subpixels per pixel is increased, there will certainly be an advantage but some disadvantages will be caused, too. That is why the number of subpixels per pixel may be appropriately determined according to the intended application.

Figure 25:
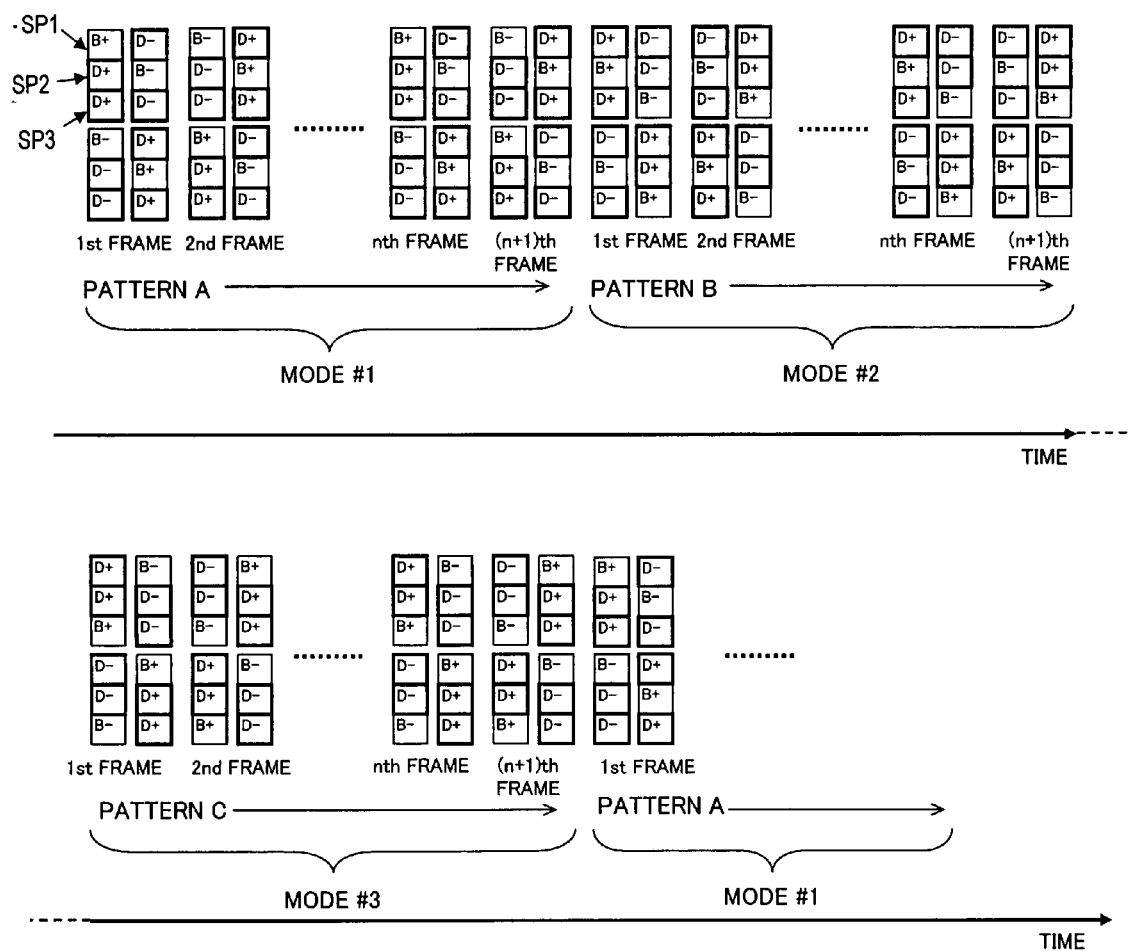
FIG. 25 shows the display state (operation state) of the liquid crystal display device of the third preferred embodiment of the present invention.

In general, according to the pixel division technique, the greater the area ratio of dark subpixel(s) to one entire pixel, the better the viewing angle characteristic. Therefore, according to this preferred embodiment, the subpixel SP1 is a bright subpixel and the subpixels SP2 and SP3 are dark subpixels in Pattern A, the subpixels SP1 and SP3 are dark subpixels and the subpixel SP2 is a bright subpixel in Pattern B, and the subpixel SP3 is a bright subpixel and the subpixels SP1 and SP2 are dark subpixels in Pattern C as shown in FIG. 25. To exchange the bright and dark pixels with time, Patterns A, B and C are switched in this order at an interval of at least two frames. In this preferred embodiment, the device is driven such that one frame=16.7 ms as in the first preferred embodiment described above.

Figure 24:
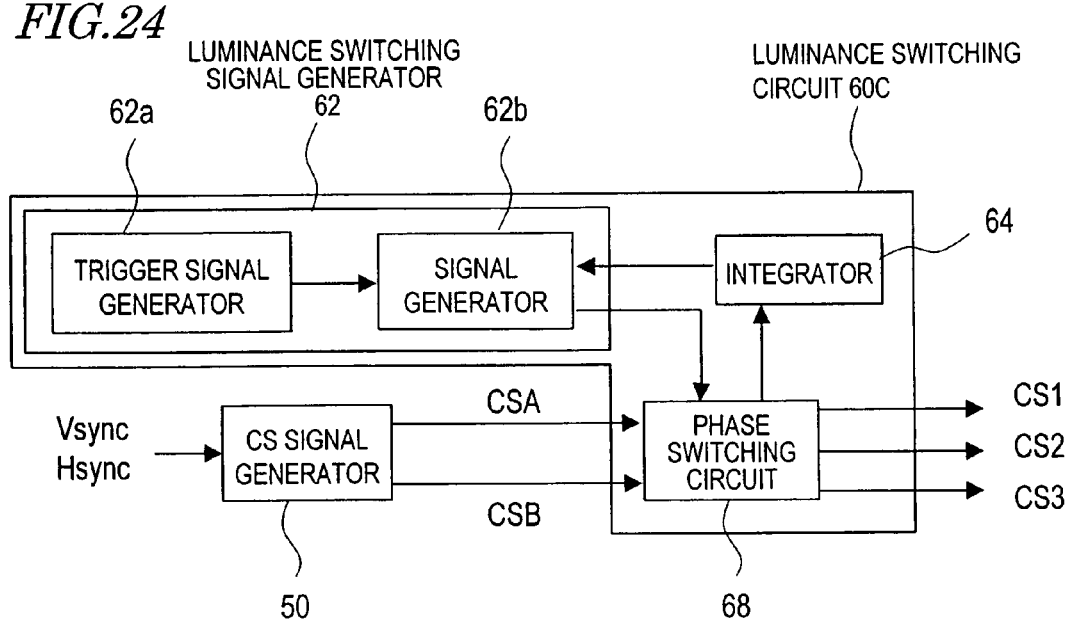
FIG. 24 is a schematic representation showing a configuration for a luminance switching circuit 60C for use in the liquid crystal display device of the third preferred embodiment of the present invention.

The bright and dark subpixels to be displayed may be switched either by shifting the phase of the CS signal or by inverting the source voltage. For example, if a configuration for shifting the phase of the CS signal is adopted, the luminance switching circuit 60C shown in FIG. 24 may be used. The luminance switching circuit 60C has basically the same configuration as the counterpart 60B shown in FIG. 15A but is different from the circuit 60B in that the phase switching circuit 68 is designed so as to output two types of CS signals CSA and CSB with mutually opposite polarities to the three CS bus lines for the three subpixels.

According to this preferred embodiment, after a predetermined time has come (i.e., when a predetermined count is reached), switching is done by inputting a trigger signal. The CS signals CSA and CSB with mutually different phases are generated by a CS signal generator 50 based on the horizontal sync signal Hsync and the vertical sync signal Vsync. These two CS signals with mutually different phases are transmitted through CS1, CS2 or CS3 by way of the phase switching circuit 68, which switches the CS signals CSA and CSB to be transmitted through CS1, CS2 or CS3 (i.e., switches Patterns A, B and C).

For example, if the average gray scale calculated over the entire screen satisfies the threshold value condition, a trigger signal for switching is output to the signal generator 62b. When changing the CS signals to switch Pattern A into Pattern B, the phase switching circuit 68 signals the integrator 64 to finish counting Pattern A, reset the counter and start counting the period in which Pattern B is displayed. If the count of Pattern B is less than the preset count, the signal generator 62b does not output the control signal even on receiving the trigger signal. When the count of Pattern B agrees with the preset count, the integrator 64 signals the signal generator 62b to get ready to generate the luminance switching signal (i.e., to enter a standby state). And when the trigger signal is supplied to the signal generator 62b in such a standby state, the luminance switching signal is input to the phase switching circuit 68, thereby switching the phases of the CS signal and getting Pattern C displayed. At the same time, Pattern B finishes being counted, the counter is reset and counting of Pattern C gets started. After the count has reached the preset value, the phase switching circuit 68 will be activated responsive to the input trigger signal, thereby switching Pattern C into Pattern A. At this time, Pattern C finishes being counted, the counter is reset and Pattern A starts being counted. By repeatedly performing these operations, the display periods of Patterns A, B and C can be controlled to predetermined values. However, to improve the viewing angle characteristic by the pixel division technique, Patterns A, B and C need to be switched at an interval of at least two frames. That is why the preset count is supposed to be at least equal to two frames.

FIG. 26 shows the drain voltage levels of respective subpixels and the counter electrode voltage level. In this preferred embodiment, the dark subpixel(s) has a greater area ratio than the bright subpixel(s). Thus, to minimize the area to which the DC voltage is applied, the counter voltage is equalized with the drain voltage DC level of the dark subpixel(s).

According to Pattern A, the subpixels SP2 and SP3 have the best counter level but the subpixel SP1 has a shifted counter level and is supplied with DC components. When Pattern A is switched into Pattern B, the subpixels SP1 and SP3 come to have the best counter level and DC components are applied to the subpixel SP2. And when Pattern B is switched into Pattern C, the subpixels SP1 and SP2 come to have the best counter level and DC components are applied to the subpixel SP3. By switching these Patterns A, B and C each other, it is possible to prevent the DC components from being applied to a particular subpixel continuously.

The drain voltage DC levels of respective subpixels with respect to the counter level do not have to be set as described above but may also be defined as shown in FIG. 27.

FIG. 27 shows the drain voltage DC levels of respective subpixels and the counter electrode voltage level. In this case, supposing the difference in drain voltage DC level between the bright and dark subpixels is $\Delta V$, the bright subpixel preferably has a drain voltage DC level of $+\frac{2}{3}\Delta V$ with respect to the counter voltage and the dark subpixels preferably have a drain voltage DC level of $-\frac{1}{3}\Delta V$ with respect to the counter level.

In Pattern A, a DC voltage of $+\frac{2}{3}\Delta V$ is applied to the subpixel SP1 and a DC voltage of $-\frac{1}{3}\Delta V$ is applied to the subpixels SP2 and SP3. In Pattern B, a DC voltage of $+\frac{2}{3}\Delta V$ is applied to the subpixel SP2 and a DC voltage of $-\frac{1}{3}\Delta V$ is applied to the subpixels SP1 and SP3. And in Pattern C, a DC voltage of $+\frac{2}{3}\Delta V$ is applied to the subpixel SP3 and a DC voltage of $-\frac{1}{3}\Delta V$ is applied to the subpixels SP1 and SP2. In the subpixels SP1, SP2 and SP3, by equalizing the display periods of Patterns A, B and C with each other, the application of the DC components can be canceled when averaged with time.

In the examples described above, each pixel is supposed to be split into two or three subpixels. The effects of the present invention are naturally achieved even if each pixel is divided into four or more subpixels.

INDUSTRIAL APPLICABILITY

According to the present invention, a liquid crystal display device with a pixel division structure, in which each pixel is made up of a plurality of subpixels, can reduce the DC voltages generated in the respective subpixels to almost zero when the voltages are averaged, thus increasing the reliability of LCDs. Thus, the present invention contributes to improving the display quality and increasing the reliability of LCDs with a big monitor screen such as LCD TV monitors.

The invention claimed is:

1. A liquid crystal display device comprising:

an LCD panel including a liquid crystal layer, a plurality of electrodes for applying a voltage to the liquid crystal layer, and a pixel of which the luminance varies according to a display signal voltage supplied through at least one transistor, the pixel including a first subpixel to have a first luminance and a second subpixel to have a second luminance, which is different from the first luminance, in response to at least one display signal voltage supplied;

a source driver for supplying the display signal voltage to a source bus line that is connected to the source of the transistor;

a gate driver for supplying a scan signal voltage to a gate bus line that is connected to the gate of the transistor;

luminance switching circuitry for switching the modes of operation from a first mode, in which the first luminance is higher than the second luminance, into a second mode, in which the first luminance is lower than the second luminance, and vice versa;

wherein each of the first and second subpixels further includes: a liquid crystal capacitor formed by a counter electrode and a subpixel electrode that faces the counter electrode through the liquid crystal layer; a storage capacitor formed by a storage capacitor electrode that is electrically connected to the subpixel electrode, an insulating layer, and a storage capacitor counter electrode that is opposed to the storage capacitor electrode with the insulating layer interposed between them; and a storage capacitor counter voltage generator for generating a voltage to be applied to the storage capacitor counter electrode, wherein the counter electrode is a single electrode provided in common for the first and second subpixels, while the storage capacitor counter electrodes of the first and second subpixels are electrically independent of each other, and wherein the device further includes two switching elements that are provided for the first and second subpixels, respectively, wherein the ON/OFF states of the two switching elements are controlled in accordance with a scan signal voltage supplied through a common gate bus line; when the two switching elements are ON, a display signal voltage is applied through a common source bus line to the subpixel electrodes and the storage capacitor electrodes of the first and second subpixels, where the first and second subpixel electrodes of the respective first and second subpixels share the common source bus line and the common gate bus line; after the two switching elements have been turned OFF, the voltages at the storage capacitor counter electrodes of the first and second subpixels vary; and the first and second subpixels have mutually different variations, which are defined by their directions and amplitudes, thus making the first and second luminances different from each other;

wherein the luminance switching circuitry includes a circuit for inverting the phases of voltages to be applied to the storage capacitor counter electrodes of the first and second subpixels so that during the first mode a first pattern is applied to the storage capacitor counter electrode of the first subpixel with the first subpixel being a bright subpixel, and during the second mode a second pattern different than the first pattern is applied to the storage capacitor counter electrode of the first subpixel with the first subpixel being a dark subpixel, wherein the first and second patterns applied to the storage capacitor counter electrode in the first and second respective modes have phases inverted relative to each other; and wherein the switching of the mode of operation is performed by inverting the phases of voltages to be applied to the storage capacitor counter electrodes of the first and second subpixels.

2. The liquid crystal display device of claim 1, wherein the luminance switching circuitry further includes a circuit for counting and measuring the amount of time that has passed since the modes were switched, and switches the modes of operation every time a predetermined amount of time passes.

3. The liquid crystal display device of claim 1, further comprising a circuit for finding the integral of operating periods in the first mode and the integral of operating periods in the second mode, wherein when a difference between the integral of the operating periods in the first mode and that of the operating periods in the second mode exceeds a predetermined value, the luminance switching circuitry switches the modes of operation.

4. The liquid crystal display device of claim 1, wherein when a difference between the first and second luminances exceeds a predetermined value, the luminance switching circuitry switches the modes of operation.

5. The liquid crystal display device of claim 1, further comprising a circuit for calculating an average luminance over the entire screen, wherein when the average luminance falls within a predetermined range, the luminance switching circuitry switches the modes of operation.

6. The liquid crystal display device of claim 5, wherein the predetermined range corresponds to gray scales at which the ratio of the difference between the first and second luminances to the average of the first and second luminances is 90% or less of its maximum value.

7. The liquid crystal display device of claim 1, wherein the luminance switching circuitry switches the modes of operation in accordance with a predetermined instruction given by the operator of the device.

8. The liquid crystal display device of claim 1, wherein when a predetermined variation is produced in the input image signal, the luminance switching circuitry switches the modes of operation.

9. The liquid crystal display device of claim 1, wherein the luminance switching circuitry further includes a luminance switching signal generator for generating a luminance switching signal when a predetermined condition is satisfied, and the circuitry switches the modes of operation in response to the luminance switching signal.

10. The liquid crystal display device of claim 9, wherein the luminance switching signal generator includes a plurality of trigger signal generators for generating trigger signals on mutually different conditions and a signal generator for generating the luminance switching signal responsive to the trigger signals supplied from the plurality of trigger signal generators.

11. The liquid crystal display device of claim 1, wherein the areas of the first and second subpixels are approximately equal to each other.

12. The liquid crystal display device of claim 1, wherein the pixel further includes a third subpixel.

13. The device of claim 1, wherein the luminance switching circuitry switches the modes of operation from the first mode, in which the first luminance is higher than the second luminance, into the second mode, in which the first luminance is lower than the second luminance, and vice versa, at a switching interval of at least 83.5 ms.

14. A liquid crystal display device comprising:
an LCD panel including a liquid crystal layer, a plurality of electrodes for applying a voltage to the liquid crystal layer, and a pixel of which the luminance varies according to a display signal voltage supplied through at least one transistor,
the pixel including a first subpixel to have a first luminance and a second subpixel to have a second luminance, which is different from the first luminance, in response to at least one display signal voltage supplied;
a source driver for supplying the display signal voltage to a source bus line that is connected to the source of the transistor;
a gate driver for supplying a scan signal voltage to a gate bus line that is connected to the gate of the transistor;
luminance switching circuitry for switching the modes of operation from a first mode, in which the first luminance is higher than the second luminance, into a second mode, in which the first luminance is lower than the second luminance, and vice versa;
wherein each of the first and second subpixels further includes: a liquid crystal capacitor formed by a counter electrode and a subpixel electrode that faces the counter electrode through the liquid crystal layer; a storage capacitor formed by a storage capacitor electrode that is electrically connected to the subpixel electrode, an insulating layer, and a storage capacitor counter electrode that is opposed to the storage capacitor electrode with the insulating layer interposed between them; and a storage capacitor counter voltage generator for generating a voltage to be applied to the storage capacitor counter electrode,
wherein the counter electrode is a single electrode provided in common for the first and second subpixels, while the storage capacitor counter electrodes of the first and second subpixels are electrically independent of each other, and
wherein the device further includes two switching elements that are provided for the first and second subpixels, respectively, and
wherein the ON/OFF states of the two switching elements are controlled in accordance with a scan signal voltage supplied through a common gate bus line; when the two switching elements are ON, a display signal voltage is applied through a common source bus line to the subpixel electrodes and the storage capacitor electrodes of the first and second subpixels, where the first and second subpixel electrodes of the respective first and second subpixels share the common source bus line and the common gate bus line; after the two switching elements have been turned OFF, the voltages at the storage capacitor counter electrodes of the first and second subpixels vary; and the first and second subpixels have mutually different variations, which are defined by their directions and amplitudes, thus making the first and second luminances different from each other;
wherein the luminance switching circuitry includes a circuit for inverting the phases of the display signal voltages to be supplied to the first and second subpixels, so that during the first mode a first pattern is applied to the common source bus line with the first subpixel being a bright subpixel and the second subpixel being a dark subpixel, and during the second mode a second pattern different than the first pattern is applied to the common source bus line with the first subpixel being a dark subpixel and the second subpixel being a bright subpixel, wherein the first and second patterns applied to the common source bus line in the first and second respective modes have phases inverted relative to each other; and
wherein the switching of the mode of operation is performed by inverting the phases of the display signal voltages to be supplied to the first and second subpixels.

15. The liquid crystal display device of claim 14, wherein the luminance switching circuitry further includes a circuit for counting and measuring the amount of time that has passed since the modes were switched, and switches the modes of operation every time a predetermined amount of time passes.

16. The liquid crystal display device of claim 14, further comprising a circuit for finding the integral of operating periods in the first mode and the integral of operating periods in the second mode,
wherein when a difference between the integral of the operating periods in the first mode and that of the operating periods in the second mode exceeds a predetermined value, the luminance switching circuitry switches the modes of operation.

17. The liquid crystal display device of claim 14, wherein when a difference between the first and second luminances exceeds a predetermined value, the luminance switching circuitry switches the modes of operation.

18. The liquid crystal display device of claim 4, further comprising a circuit for calculating an average luminance over the entire screen,
wherein when the average luminance falls within a predetermined range, the luminance switching circuitry switches the modes of operation.

19. The liquid crystal display device of claim 18, wherein the predetermined range corresponds to gray scales at which the ratio of the difference between the first and second luminances to the average of the first and second luminances is 90% or less of its maximum value.

20. The liquid crystal display device of claim 14, wherein the luminance switching circuitry switches the modes of operation in accordance with a predetermined instruction given by the operator of the device.

21. The liquid crystal display device of claim 14, wherein when a predetermined variation is produced in the input image signal, the luminance switching circuitry switches the modes of operation.

22. The liquid crystal display device of claim 14, wherein the luminance switching circuitry further includes a luminance switching signal generator for generating a luminance switching signal when a predetermined condition is satisfied, and the circuitry switches the modes of operation in response to the luminance switching signal.

23. The liquid crystal display device of claim 22, wherein the luminance switching signal generator includes a plurality of trigger signal generators for generating trigger signals on mutually different conditions and a signal generator for generating the luminance switching signal responsive to the trigger signals supplied from the plurality of trigger signal generators.

24. The liquid crystal display device of claim 14, wherein the areas of the first and second subpixels are approximately equal to each other.

25. The liquid crystal display device of claim 14, wherein the pixel further includes a third subpixel.

26. The device of claim 14, wherein the luminance switching circuitry switches the modes of operation from the first mode into the second mode, and vice versa, at a switching interval of at least 83.5 ms.

27. A liquid crystal display device comprising:
an LCD panel including a liquid crystal layer, a plurality of electrodes for applying a voltage to the liquid crystal layer, and a pixel, of which the luminance varies according to a display signal voltage supplied through a transistor, the pixel being split into at least first and second subpixels for conducting a display operation at mutually different luminances in response to at least one display signal voltage supplied;
a source driver for supplying the display signal voltage to a source bus line that is connected to the source of the transistor;
a gate driver for supplying a scan signal voltage to a gate bus line that is connected to the gate of the transistor; and
luminance switching circuitry for switching the modes of operation between a plurality of modes in which one of the first and second subpixels that has the highest luminance changes its locations within the pixel;
wherein each of the first and second subpixels further includes: a liquid crystal capacitor formed by a counter electrode and a subpixel electrode that faces the counter electrode through the liquid crystal layer; a storage capacitor formed by a storage capacitor electrode that is electrically connected to the subpixel electrode, an insulating layer, and a storage capacitor counter electrode that is opposed to the storage capacitor electrode with the insulating layer interposed between them; and a storage capacitor counter voltage generator for generating a voltage to be applied to the storage capacitor counter electrode,
wherein the counter electrode is a single electrode provided in common for the first and second subpixels, while the storage capacitor counter electrodes of the first and second subpixels are electrically independent of each other,
wherein the device further includes a plurality of switching elements that are provided for the respective first and second subpixels,
wherein the ON/OFF states of the switching elements are controlled in accordance with a scan signal voltage supplied through a common gate bus line; when the switching elements are ON, a display signal voltage is applied through a common source bus line to the subpixel electrodes and the storage capacitor electrodes of the first and second subpixels, where the first and second subpixel electrodes of the respective first and second subpixels share the common source bus line and the common gate bus line; after the switching elements have been turned OFF, the voltages at the storage capacitor counter electrodes of the first and second subpixels vary; and the first and second subpixels have mutually different variations, which are defined by their directions and amplitudes, thus making the luminances of the first and second subpixels different from each other;
wherein the luminance switching circuitry includes a circuit for inverting the phases of voltages to be applied to the storage capacitor counter electrodes of the first and second subpixels, wherein the phase of voltage applied to the storage capacitor counter electrode of the first subpixel is inverted from a first mode to a second mode, and wherein the phase of voltage applied to the storage capacitor counter electrode of the second subpixel is inverted from the first mode to the second mode, so that said inverting occurs on each of the storage capacitor counter electrode of the first subpixel and the storage capacitor counter electrode of the second subpixel; and
wherein the switching of the mode of operation is performed by inverting the phases of voltages to be applied to the storage capacitor counter electrodes of the first and second subpixels.

28. The liquid crystal display device of claim 27, wherein one of the first and second subpixels that has the highest luminance and another one of the first and second subpixels that has the lowest luminance have substantially equal areas.

29. The liquid crystal display device of claim 27, wherein the areas of the first and second subpixels are substantially equal to each other.

30. The device of claim 27, wherein the luminance switching circuitry switches the modes of operation between the plurality of modes at a switching interval of at least 83.5 ms.

31. A liquid crystal display device comprising:
an LCD panel including a liquid crystal layer, a plurality of electrodes for applying a voltage to the liquid crystal layer, and a pixel, of which the luminance varies according to a display signal voltage supplied through a transistor, the pixel being split into at least first and second subpixels for conducting a display operation at mutually different luminances in response to at least one display signal voltage supplied;
a source driver for supplying the display signal voltage to a source bus line that is connected to the source of the transistor;
a gate driver for supplying a scan signal voltage to a gate bus line that is connected to the gate of the transistor; and
luminance switching circuitry for switching the modes of operation between a plurality of modes in which one of the first and second subpixels that has the highest luminance changes its locations within the pixel;
wherein each of the first and second subpixels further includes: a liquid crystal capacitor formed by a counter electrode and a subpixel electrode that faces the counter electrode through the liquid crystal layer; a storage capacitor formed by a storage capacitor electrode that is electrically connected to the subpixel electrode, an insulating layer, and a storage capacitor counter electrode that is opposed to the storage capacitor electrode with the insulating layer interposed between them; and a storage capacitor counter voltage generator for generating a voltage to be applied to the storage capacitor counter electrode,
wherein the counter electrode is a single electrode provided in common for the first and second subpixels, while the storage capacitor counter electrodes of the first and second subpixels are electrically independent of each other,
wherein the device further includes a plurality of switching elements that are provided for the respective first and second subpixels, wherein the ON/OFF states of the switching elements are controlled in accordance with a scan signal voltage supplied through a common gate bus line; when the switching elements are ON, a display signal voltage is applied through a common source bus line to the subpixel electrodes and the storage capacitor electrodes of the first and second subpixels, where the first and second subpixel electrodes of the respective first and second subpixels share the common source bus line and the common gate bus line; after the switching elements have been turned OFF, the voltages at the storage capacitor counter electrodes of the first and second subpixels vary; and the first and second subpixels have mutually different variations, which are defined by their directions and amplitudes, thus making the luminances of the first and second subpixels different from each other; and wherein the luminance switching circuitry includes a circuit for inverting the phases of the display signal voltages to be supplied to the first and second subpixels, and wherein said switching of the mode of operation comprises inverting the phases of the display of the display signal voltages to be supplied to the first and second subpixels, so that during a first mode a first pattern is applied to the common source bus line with the first subpixel being a bright subpixel and the second subpixel being a dark subpixel, and during a second mode a second pattern different than the first pattern is applied to the common source bus line with the first subpixel being a dark subpixel and the second subpixel being a bright subpixel, wherein the first and second patterns applied to the common source bus line in the first and second respective modes have phases inverted relative to each other.

32. The liquid crystal display device of claim 31, wherein one of the first and second subpixels that has the highest luminance and another one of the first and second subpixels that has the lowest luminance have substantially equal areas.

33. The liquid crystal display device of claim 31, wherein the areas of the first and second subpixels are substantially equal to each other.

34. The device of claim 31, wherein the luminance switching circuitry switches the modes of operation between the plurality of modes at a switching interval of at least 83.5 ms.

* * * * *